(12) United States Patent  
Sundkvist et al.

(10) Patent No.: US 11,965,360 B2  
(45) Date of Patent: Apr. 23, 2024

(54) LOCK DEVICE FOR AN ELECTRONIC LOCKING SYSTEM, ELECTRONIC LOCKING SYSTEM AND METHOD

(71) Applicant: ASSA ABLOY AB, Stockholm (SE)

(72) Inventors: Oscar Sundkvist, Täby (SE); Johan Von Matern, Täby (SE); Daniel Skarp, Sundbyberg (SE)

(73) Assignee: ASSA ABLOY AB, Stockholm (SE)

( * ) Notice: Subject to any disclaimer, the term of this patent is extended or adjusted under 35 U.S.C. 154(b) by 896 days.

(21) Appl. No.: 16/970,291

(22) PCT Filed: Feb. 26, 2019

(86) PCT No.: PCT/EP2019/054649  
§ 371 (c)(1),  
(2) Date: Aug. 14, 2020

(87) PCT Pub. No.: WO2019/166389  
PCT Pub. Date: Sep. 6, 2019

(65) Prior Publication Data  
US 2021/0079691 A1 Mar. 18, 2021

(30) Foreign Application Priority Data  
Mar. 2, 2018 (EP) .................................... 18159661

(51) Int. Cl.  
*E05B 47/06* (2006.01)  
*E05B 15/00* (2006.01)  
(Continued)

(52) U.S. Cl.  
CPC ...... *E05B 47/0657* (2013.01); *E05B 15/0033* (2013.01); *H02K 7/1807* (2013.01);  
(Continued)

(58) Field of Classification Search  
CPC ............. E05B 47/0657; E05B 15/0033; E05B 2047/002; E05B 2047/0024;  
(Continued)

(56) References Cited

U.S. PATENT DOCUMENTS

| 6,038,895 A | * | 3/2000 | Menke | .................... E05B 81/84 70/278.1 |
| 6,370,928 B1 | * | 4/2002 | Chies | ................. G07C 9/00309 70/279.1 |

(Continued)

FOREIGN PATENT DOCUMENTS

| CN | 102232135 | 11/2011 |
| CN | 103732844 | 4/2014 |

(Continued)

OTHER PUBLICATIONS

Official Action with English Translation for China Patent Application No. 201980016356.5, dated Jan. 25, 2021, 14 pages.

(Continued)

*Primary Examiner* — Victor D Batson  
*Assistant Examiner* — James Edward Ignaczewski  
(74) *Attorney, Agent, or Firm* — Schwegman Lundberg & Woessner, P.A.

(57) ABSTRACT

Lock device (10) for an electronic locking system (126), the lock device (10) comprising an input member (12) arranged to rotate about an input rotational axis (16); an output member (18) arranged to rotate about an output rotational axis (22); an energy harvesting arrangement (26) configured to generate electric energy from rotation of the input member (12) in a first direction (28) about the input rotational axis (16); and a selective transfer device (54) movable between a locking state, in which the output member (18) cannot be rotated about the output rotational axis (22) by means of rotation of the input member (12) about the input (Continued)

rotational axis (16), and an unlocking state, in which the output member (18) can be rotated about the output rotational axis (22) by means of rotation of the input member (12) in the first direction (28) about the input rotational axis (16); wherein the transfer device (54) is powered by the energy harvesting arrangement (26). An electronic locking system (126) and a method are also provided.

14 Claims, 8 Drawing Sheets

(51) Int. Cl.
    *H02K 7/18*     (2006.01)
    *E05B 47/00*     (2006.01)
(52) U.S. Cl.
    CPC . *E05B 2047/002* (2013.01); *E05B 2047/0024* (2013.01); *E05B 2047/0026* (2013.01); *E05B 2047/0062* (2013.01)
(58) Field of Classification Search
    CPC .... E05B 2047/0026; E05B 2047/0062; H02K 7/1807
    USPC ...................................................... 292/336.3
    See application file for complete search history.

(56) References Cited

U.S. PATENT DOCUMENTS

| | | | | |
|---|---|---|---|---|
| 8,683,833 | B2* | 4/2014 | Marschalek | E05B 47/0673 70/222 |
| 8,899,081 | B2* | 12/2014 | Pukari | E05B 47/0012 70/283.1 |
| 11,168,493 | B2* | 11/2021 | Kellokoski | E05B 47/02 |
| 11,286,691 | B2* | 3/2022 | Kurki | G07C 9/00174 |
| 2006/0156771 | A1* | 7/2006 | Hauri | E05B 47/0649 70/278.7 |
| 2011/0011822 | A1 | 1/2011 | Chen | |
| 2012/0011902 | A1 | 1/2012 | Meekma | |
| 2012/0111072 | A1* | 5/2012 | Pukari | G07C 9/00309 70/279.1 |
| 2014/0109633 | A1 | 4/2014 | Romero | |
| 2014/0225375 | A1* | 8/2014 | Chang | E05B 1/003 290/1 C |
| 2017/0284124 | A1 | 10/2017 | Ou et al. | |
| 2018/0202193 | A1* | 7/2018 | Piirainen | E05B 47/0673 |

FOREIGN PATENT DOCUMENTS

| | | |
|---|---|---|
| CN | 107109865 | 8/2017 |
| DE | 3208818 | 9/1983 |
| DE | 102004041518 | 9/2005 |
| DE | 102016012607 A1 * | 4/2018 |
| EP | 0462316 | 12/1991 |
| EP | 1808816 | 7/2007 |
| EP | 2728092 | 5/2014 |
| EP | 3118977 | 1/2017 |
| EP | 3533956 | 9/2019 |
| EP | 3533956 | 1/2021 |
| WO | WO 99/18310 | 4/1999 |
| WO | 2019166389 | 9/2019 |

OTHER PUBLICATIONS

Official Action with English Translation for China Patent Application No. 201980016356.5, dated Jul. 19, 2021, 7 pages.
Extended Search Report for European Patent Application No. 18159661.0, dated Jun. 19, 2018, 6 pages.
International Search Report and Written Opinion for International (PCT) Patent Application No. PCT/EP2019/054649, dated Apr. 26, 2019, 12 pages.
"International Application Serial No. PCT EP2019 054649, International Preliminary Report on Patentability dated Sep. 17, 2020", 7 pgs.
"European Application Serial No. 18159661.0, Response filed Feb. 19, 2020 to Extended European Search Report dated Jun. 19, 2018", 10 pgs.
"European Application Serial No. 18159661.0, Intention to Grant dated Sep. 14, 2020", 55 pgs.
"Application No. 23189926.1 European search report mailed Oct. 31, 2023", 11 pages.

* cited by examiner

LOCK DEVICE FOR AN ELECTRONIC LOCKING SYSTEM, ELECTRONIC LOCKING SYSTEM AND METHOD

CROSS REFERENCE TO RELATED APPLICATIONS

This application is a national stage application under 35 U.S.C. 371 and claims the benefit of PCT Application No. PCT/EP2019/054649 having an international filing date of Feb. 26, 2019, which designated the United States, which PCT application claimed the benefit of European Patent Application No. 18159661.0 filed Mar. 2, 2018, the disclosure of each of which are incorporated herein by reference.

TECHNICAL FIELD

The present disclosure generally relates to a lock device for an electronic locking system. In particular, a lock device for an electronic locking system where the lock device comprises an energy harvesting arrangement; an electronic locking system comprising the lock device, and a method for operating a lock device of an electronic locking system, are provided.

BACKGROUND

Various types of electronic locking systems are known. Instead of utilizing a purely mechanical lock, some locking systems include an electronic drive of a lock member (e.g. a lock bolt) to unlock, for example, a door to give access to the area behind the door.

Furthermore, instead of utilizing a traditional key to unlock the door, various types of electronic communication methods for authorizing a person to access the area behind the door are known. For example, a Radio Frequency Identification (RFID) system may be used where a reader of the RFID system is installed in the door and a tag is carried by or attached to an object to be identified.

In order to power an electronic locking system, so called "self-powered" electronic locking systems have been proposed, where electricity is generated by a mechanical actuation of a door handle and is used to power the electronic locking system. This concept is also known as energy harvesting.

US 2014/0225375 Ai discloses a power supply device for a door handle. By turning a door handle to move a latch, a rotation shaft of the door handle is driven to turn a drive gear. The rotation of the drive gear is transmitted to a rotation of a generator shaft to generate power for an electric lock.

Furthermore, some locking assemblies comprise a latch shaft blocked by a blocking device. If the latch shaft can only adopt two states, i.e. either a blocking state or an unblocking state, the handle shaft cannot be used for energy harvesting when being blocked. Such locking assemblies typically require a further power source for manoeuvring the blocking device.

SUMMARY

One object of the present disclosure is to provide a lock device for an electronic locking system, which lock device enables energy harvesting while the lock device is locked.

A more specific object of the present disclosure is to provide a lock device for an electronic locking system, which lock device enables energy harvesting while a latch shaft is blocked or while a latch shaft is decoupled from a handle shaft.

A further object of the present disclosure is to provide a lock device for an electronic locking system, which lock device can harvest energy and rotate an output member by means of one single rotation of an input member, i.e. that provides seamless access.

A still further object of the present disclosure is to provide a lock device for an electronic locking system, which lock device has a simple (e.g. with few parts), compact, reliable and/or cheap design.

A still further object of the present disclosure is to provide a lock device for an electronic locking system, which lock device has a low energy consumption.

A still further object of the present disclosure is to provide a lock device for an electronic locking system which, lock device provides a good protection against manipulation of a latch.

A still further object of the present disclosure is to provide a lock device for an electronic locking system, which lock device comprises a transfer device that can be moved between a locking state and an unlocking state by a stationary actuator.

A still further object of the present disclosure is to provide a lock device for an electronic locking system, which lock device solves several or all of the foregoing objects.

A still further object of the present disclosure is to provide an electronic locking system comprising a lock device, which electronic locking system solves one, several or all of the foregoing objects.

A still further object of the present disclosure is to provide a method for operating a lock device of an electronic locking system, which method solves one, several or all of the foregoing objects.

According to one aspect, there is provided a lock device for an electronic locking system, the lock device comprising an input member arranged to rotate about an input rotational axis; an output member arranged to rotate about an output rotational axis; an energy harvesting arrangement configured to generate electric energy from rotation of the input member in a first direction about the input rotational axis; and a selective transfer device movable between a locking state, in which the output member cannot be rotated about the output rotational axis by means of rotation of the input member about the input rotational axis, and an unlocking state, in which the output member can be rotated about the output rotational axis by means of rotation of the input member in the first direction about the input rotational axis; wherein the transfer device is powered by the energy harvesting arrangement. Throughout the present disclosure, the locking state and the unlocking state of the transfer device may be constituted by a locking position and an unlocking position, respectively.

The lock device may be said to be locked and unlocked, respectively, when the transfer device adopts the locking state and the unlocking state, respectively.

The lock device may thus be configured such that the input member can be rotated (e.g. 45° to 135°, such as 80° to 100°, such as 90°, or continuously, about the input rotational axis) when the transfer device adopts the locking state. In the locking state of the transfer device, the transfer device may for example block the output member, and/or decouple the output member from the input member. Conversely, in the unlocking state of the transfer device, the transfer device may for example unblock the output member, and/or couple the output member to the input member.

Throughout the present disclosure, the locking state of the transfer device may be referred to as a first position and the unlocking state of the transfer device may be referred to as a second position.

With the lock device, the input member can be rotated about the input rotational axis and energy from this rotation can be harvested while the transfer device is in the locking state, regardless of whether or not access is granted and the transfer device is subsequently moved to the unlocking state. Once sufficient energy for activation of the transfer device has been generated by the energy harvesting arrangement, the transfer device can be moved from the locking state to the unlocking state.

When the input member is rotated a first angular distance in the first direction about the input rotational axis, the harvested energy may be used to wake up an access control device, to perform an access control procedure by the access control device and to move the transfer device from the locking state to the unlocking state (if access is granted) and back to the locking state. If access is granted, the input member may be rotated a second angular distance, following the first angular distance, in the first direction about the input rotational axis to manipulate the output member, e.g. a latch shaft, to open the lock device. The rotation of the input member may be continuous through the first angular distance and the second angular distance in the first direction about the input rotational axis. Thereby, based on one single 3o rotation of the input member, the lock device can carry out an access control procedure by energy harvested by the rotation, the transfer device can be moved from the locking state to the unlocking state by energy harvested by the rotation and the output member can be rotated, e.g. a latch shaft can be rotated from a locking state to an unlocking state. In other words, the same single movement can be used to generate energy and unlock the lock device. The energy harvested by the same rotation may also be used to move the transfer device from the unlocking state back to the locking state.

The transfer device may be powered directly by the energy harvesting arrangement. Alternatively, or in addition, the energy harvesting arrangement may comprise a power storage unit. In this case, the transfer device may be powered indirectly by the harvesting arrangement, i.e. via the power storage unit. Examples of power storage units according to the present disclosures are capacitors and supercapacitors.

The transfer device may only be powered by the energy harvesting arrangement. The lock device according to the present disclosure may alternatively be referred to as a lock assembly.

The input rotational axis and the output rotational axis may be substantially concentric, or concentric. Alternatively, the input rotational axis and the output rotational axis may be offset from each other. Alternatively, the input rotational axis and the output rotational axis may be angled relative to each other.

According to one variant, the input member comprises an engaging structure; the output member comprises an engageable structure arranged to be engaged by the engaging structure; the transfer device is constituted by a blocking device movable between a blocking state, in which the blocking device blocks the output member from rotating about the output rotational axis, and an unblocking state, in which the output member is allowed to rotate about the output rotational axis; and the engaging structure is rotatable about the input rotational axis through an angular clearance prior to engaging the engageable structure. With this variant, energy harvesting can be carried out while rotating the input member through the angular 3o clearance. Throughout the present disclosure, the blocking state and the unblocking state of the blocking device may be constituted by a blocking position and an unblocking position, respectively.

In this variant, the locking state of the transfer device is constituted by the blocking state of the blocking device and the unlocking state of the transfer device is constituted by the unblocking state of the blocking device. When the blocking device adopts the blocking state, the output member is blocked from rotation about the output rotational axis. Even if the output member is blocked, the input member can be rotated through the angular clearance and energy can be harvested from this rotation of the input member.

Thus, the present disclosure provides for a lock device for an electronic locking system, the lock device comprising an input member arranged to rotate about an input rotational axis, the input member comprising an engaging structure; an output member arranged to rotate about an output rotational axis, the output member comprising an engageable structure arranged to be engaged by the engaging structure; an energy harvesting arrangement configured to generate electric energy from rotation of the input member in a first direction about the input rotational axis; and a blocking device movable between a blocking state, in which the blocking device blocks the output member from rotating about the output rotational axis, and an unblocking state, in which the output member is allowed to rotate about the output rotational axis, with energy from the energy harvesting arrangement; wherein the engaging structure is rotatable in the first direction about the input rotational axis through an angular clearance prior to engaging the engageable structure.

The blocking device may for example comprise a movable blocking member that is moved into a recess in the output member when adopting the blocking state and that is moved out from the recess when adopting the unblocking state.

The angular clearance may be 45° to 135°, such as 80° to 100°, such as 90°, about the input rotational axis. Throughout the present disclosure, an angular clearance may alternatively be referred to as a sector or free sector.

The engaging structure may comprise at least one engaging protrusion. The at least one engaging protrusion may be constituted by a pin. The engageable structure may comprise at least one engageable protrusion. The at least one engageable protrusion is constituted by a stop.

According to a further variant, the transfer device is constituted by a coupling device movable between a decoupling state, in which the input member is decoupled from the output member, and a coupling state, in which the input member is coupled to the output member. In the coupling state of the coupling device, the input member may be fixedly coupled to the output member, e.g. for common rotation about the input rotational axis. Throughout the present disclosure, the decoupling state and the coupling state of the coupling device may be constituted by a decoupling position and a coupling position, respectively.

Even if rotation of the input member is not transferred to the output member, energy can be harvested from the rotation of the input member. Thus, with this variant, energy harvesting can be carried out prior to coupling the input member to the output member.

In this variant, the locking state of the transfer device is constituted by the decoupling state of the coupling device and the unlocking state of the transfer device is constituted by the coupling state of the coupling device. The lock device of this variant may be arranged in a lock case.

Thus, the present disclosure provides for a lock device for an electronic locking system, the lock device comprising an input member arranged to rotate about an input rotational axis; an output member arranged to rotate about an output rotational axis; an energy harvesting arrangement configured to generate electric energy from rotation of the input member in a first direction about the input rotational axis; and a coupling device movable between a decoupling state, in which the input member is decoupled from the output member, to a coupling state, in which the input member is coupled to the output member; and wherein the coupling device is powered by the energy harvesting arrangement.

According to a further variant, transfer device is constituted by a blocking and coupling device, the blocking and coupling device comprising a blocking part movable between a blocking state, in which the blocking part blocks the output member from rotating about the output rotational axis, and an unblocking state, in which the output member is allowed to rotate about the output rotational axis; and a coupling part movable between a decoupling state, in which the input member is decoupled from the output member, and a coupling state, in which the input member is coupled to the output member; wherein the coupling part is arranged to be moved between the decoupling state and the coupling state in common with a movement of the blocking part between the blocking state and the unblocking state. Throughout the present disclosure, the blocking state and the unblocking state of the blocking part may be constituted by a blocking position and an unblocking position, respectively. Moreover, throughout the present disclosure, the decoupling state and the coupling state of the coupling part may be constituted by a decoupling position and a coupling position, respectively.

In this variant, the locking state of the transfer device is constituted by a locking state of the blocking and coupling device and the unlocking state of the transfer device is constituted by an unlocking state of the blocking and coupling device. The locking state of the blocking and coupling device is in turn constituted by the blocking state of the blocking part and by the decoupling state of the coupling part. Furthermore, the unlocking state of the blocking and coupling device is constituted by the unblocking state of the blocking part and by the coupling state of the coupling part.

Thus, the present disclosure provides for a lock device for an electronic locking system, the lock device comprising an input member arranged to rotate about an input rotational axis; an output member arranged to rotate about an output rotational axis; an energy harvesting arrangement configured to generate electric energy from rotation of the input member in a first direction about the input rotational axis; and a blocking and coupling device, the blocking and coupling device comprising a blocking part movable between a blocking state, in which the blocking part blocks the output member from rotating about the output rotational axis, and an unblocking state, in which the output member is allowed to rotate about the output rotational axis; and a coupling part movable between a decoupling state, in which the input member is decoupled from the output member, and a coupling state, in which the input member is coupled to the output member; wherein the coupling part is arranged to be moved between the decoupling state and the coupling state by means of a movement of the blocking part between the blocking state and the unblocking state.

When the coupling part adopts the decoupling state, the input member is free to rotate about the input rotational axis. Energy from this rotation can thereby be harvested by the energy harvesting arrangement. The lock device of this variant may comprise an actuator powered by the energy harvesting arrangement. The actuator may be arranged to push the blocking part from the blocking state to the unblocking state and arranged to pull the blocking part from the unlocking state back to the blocking state.

When the lock device comprises a blocking and coupling device according to the present disclosure, the input rotational axis and the output rotational axis may be concentric. In this case, the input member and the output member may be coupled to rotate together about a common rotational axis, e.g. about the input rotational axis and the output rotational axis, in the coupling state of the coupling part.

The coupling part may be moved from the decoupling state to the coupling state by means of the movement (e.g. by pushing and/or pulling) of the blocking part from the blocking state to the unblocking state. Conversely, the coupling part may be moved from the coupling state to the decoupling state by means of the movement (e.g. by pushing and/or pulling) of the blocking part from the unblocking state to the blocking state.

The movement of the coupling part between the decoupling state and the coupling state, and consequently the movement of the blocking part between the blocking state and the unblocking state, may be in a direction substantially perpendicular to, or perpendicular to, the input rotational axis. When the coupling part adopts the coupling state, a rotation of the input member about the input rotational axis may be transferred to a movement of the coupling part in a direction substantially perpendicular to, or perpendicular to, the movement of the blocking part between the blocking state and the unblocking state. The movement of the coupling part in the direction substantially perpendicular to, or perpendicular to, the movement of the blocking part between the blocking state and the unblocking state, may be transferred to a rotation of the output member about the output rotational axis. In this way, the input member is coupled to the output member.

The blocking part may comprise a frame. In this case, the coupling part may be constituted by a slider member movable within the frame. The slider member may for example be guided along a track in the frame.

The slider member may comprise a plate, e.g. oriented substantially perpendicular to, or perpendicular to, the input rotational axis. The slider member may further comprise an input member engaging profile on a side of the plate facing the input member and an output member engaging profile on an opposite side of the plate facing the output member. The input member may comprise an input member engageable profile for being engaged by the input member engaging profile when the coupling part adopts the coupling state. The output member may comprise an output member engageable profile for being engaged by the output member engaging profile when the coupling part adopts the coupling state. The input member engaging profile and/or the output member engaging profile may be constituted by, or comprise, one or more pins. The input member engageable profile and/or the output member engageable profile may be constituted by, or comprise, one or more teeth for being engaged by corresponding pins when the coupling part adopts the coupling state. The one or more pins of the input member engaging profile and the output member engaging profile may be arranged substantially perpendicular to, or perpendicular to, the frame.

According to a further variant, the lock device further comprises a Geneva mechanism having a rotatable drive wheel and a rotatable driven wheel, wherein the drive wheel is rotatable by rotation of the input member about the first rotational axis when the transfer device adopts the unlocking state, wherein the drive wheel cannot be rotated by rotation of the input member about the first rotational axis when the transfer device adopts the locking state, and wherein the output member is constituted by the driven wheel. Various types of Geneva mechanisms exist. The Geneva mechanism according to the present disclosure is configured to translate a continuous rotation of the drive wheel to an intermittent rotation of the driven wheel. For this purpose, the drive wheel may comprise a pin and the driven wheel may comprise one or more slots for being engaged by the pin. In this variant, the lock device may further comprise a blocking device configured to selectively block the driven wheel.

The drive wheel may comprise a blocking disc. The driven wheel may comprise a plurality of spokes and arced recesses between the spokes. In this case, each of the arced recesses has a curvature conforming to the curvature of the blocking disc. Thereby, a latch connected to, or integrally formed with, the driven wheel, cannot be rotated by manipulating the latch when the blocking disc is received in one of the arced recesses.

The lock device may further comprise a differential gear, the differential gear comprising a rotatable differential input, connected to, coupled to, integrally formed with, or constituted by the input member; a rotatable differential output, connected to, coupled to, integrally formed with, or constituted by the drive wheel; and a rotatable ring gear; wherein the differential gear is configured to transmit a rotation of the differential input to a rotation of the differential output when the ring gear is blocked and to not transmit a rotation of the differential input to a rotation of the differential output when the ring gear is unblocked; and wherein the transfer device is constituted by a blocking device movable between a blocking state, in which the blocking device blocks the ring gear, and an unblocking state, in which the blocking device unblocks the ring gear. Throughout the present disclosure, the blocking state and the unblocking state of the blocking device may be constituted by a blocking position and an unblocking position, respectively. The differential gear may for example be constituted by a ball differential.

A lock device comprising a Geneva mechanism according to the present disclosure does not necessarily need to comprise a differential gear. Alternatively, or in addition, the lock device may comprise a blocking device configured to selectively block the driven wheel in order for the lock device to adopt the locking state and the unlocking state.

The unblocking state of the blocking device thus constitutes the locking state of the transfer device and the blocking state of the blocking device thus constitutes the unlocking state of the transfer device.

The lock device may further comprise a handle connected to, or integrally formed with, the input member. The handle may for example be constituted by an elongated handle or by a knob. Thus, throughout the present disclosure, the input member may be constituted by a handle shaft.

Alternatively, or in addition, the lock device may further comprise a latch connected to, or integrally formed with, the output member. Thus, throughout the present disclosure, the output member may be constituted by a latch shaft.

The energy harvesting arrangement may comprise an electric generator; a drive member arranged to drive the electric generator, the drive member being displaceable by means of the input member from a starting position to a releasing position; an elastic element arranged to store mechanical energy from the displacement of the drive member from the starting position to the releasing position; and a release mechanism arranged to release mechanical energy stored in the elastic element to a returning displacement of the drive member when the drive member reaches the releasing position.

The release mechanism is a mechanism configured to release the drive member. The release mechanism may be configured to release the drive member at a specific position of the drive member, i.e. at the releasing position. In case the drive member is rotationally movable about a drive member rotational axis between the starting position and the releasing position, the release mechanism may be configured to release the drive member at a specific rotational position of the drive member, i.e. at the releasing position.

The release mechanism may for example comprise a release member connected to the drive member, and a stationary release member activator, such as a block. In this case, when the drive member has moved from the starting position to the releasing position, the release member can be brought into contact with the release member activator, e.g. by means of a drive pin fixed to an input member, such that the release member activator activates the release member. The activation may be constituted by a push of the release member from an extended position into a retracted position. As a consequence, the engagement between the drive pin and the release member is lost and the release mechanism is released.

The drive member may be displaceable by means of a rotation about the input rotational axis. In this case, an angular distance about the input rotational axis between the starting position and the releasing position may be less than 90°, such as 80°.

Energy harvesting arrangements according to the present disclosure are however not limited to the above type or to energy harvesting arrangements comprising a release mechanism. As one alternative example, an energy harvesting arrangement may comprise an electric generator that is continuously driven by rotation of the input member about the input rotational axis, i.e. a direct drive energy harvesting arrangement. This may for example be realized by means of a drive gear attached on the input member and a driven gear connected to a rotor of the electric generator, where the drive gear always is in meshing engagement with the driven gear. That is, the drive gear is always coupled to the driven gear.

According to a further aspect, there is provided an electronic locking system comprising a lock device according to the present disclosure and an electronic access control device powerable by the energy harvesting arrangement. The access control device may be configured to send an unlock signal or authorization signal to the transfer device upon verifying that an operator is authorized to open the lock device. The access control device may for example communicate by means of BLE (Bluetooth Low Energy).

According to a further aspect, there is provided a method for operating a lock device of an electronic locking system, the method comprising manually rotating an input member a first angular distance in a first direction about an input rotational axis while harvesting energy from the rotation by an energy harvesting arrangement; moving a selective transfer device from a locking state, in which the output member cannot be rotated about the output rotational axis by means of rotation of the input member about the input rotational axis, to an unlocking state, in which the output member can be rotated about the output rotational axis by means of rotation of the input member about the input rotational axis, with energy from the energy harvesting arrangement; and rotating the output member about the output rotational axis by manually rotating the input member a second angular distance, beyond the first angular distance, in the first direction about the input rotational axis. The moving of the transfer device from the locking state to the unlocking state may be made upon verifying that an operator is authorized to open the lock device.

According to one variant, the rotation of the input member the first angular distance comprises rotating an engaging structure of the input member through an angular clearance relative to an engageable structure of the output member; and the moving of the transfer device comprises moving a transfer device constituted by a blocking device from a blocking state, in which the blocking device blocks the output member from rotating about the output rotational axis, to an unblocking state, in which the output member is allowed to rotate about the output rotational axis. Also in the method, the angular clearance may be 45° to 135°, such as 80° to 100°, such as 90°, about the input rotational axis.

According to a further variant, the moving of the transfer device comprises moving a transfer device constituted by a coupling device from a decoupling state, in which the input member is decoupled from the output member, to a coupling state, in which the input member is coupled to the output member.

According to a further variant, the moving of the transfer device comprises moving a transfer device constituted by a blocking and coupling device from a locking state, in which the output member cannot be rotated about the output rotational axis by means of rotation of the input member about the input rotational axis, to an unlocking state, in which the output member can be rotated about output rotational axis by means of rotation of the input member in the first direction about the rotational axis. The movement of the blocking and coupling device from the locking state to the unlocking state may comprise moving a blocking part from a blocking state, in which the blocking part blocks the output member from rotating about the output rotational axis, to an unblocking state, in which the output member is allowed to rotate about the output rotational axis, and moving a coupling part in common with the blocking part from a decoupling state, in which the input member is decoupled from the output member, to a coupling state, in which the input member is coupled to the output member.

According to a further variant, the moving of the transfer device comprises moving a transfer device from a locking state, in which rotation of the input member about the input rotational axis is not transmitted to a drive wheel of a Geneva mechanism, to an unlocking state, in which rotation of the input member about the input rotational axis is transmitted to the drive wheel of the Geneva mechanism, and rotating the output member constituted by a driven gear of the Geneva mechanism by manually rotating the input member about the input rotational axis.

The following itemized listing presents various embodiments of the present disclosure.

1. Lock device for an electronic locking system, the lock device comprising an input member arranged to rotate about an input rotational axis; an output member arranged to rotate about an output rotational axis; an energy harvesting arrangement configured to generate electric energy from rotation of the input member in a first direction about the input rotational axis; and a selective transfer device movable between a locking state, in which the output member cannot be rotated about the output rotational axis by means of rotation of the input member about the input rotational axis, and an unlocking state, in which the output member can be rotated about the output rotational axis by means of rotation of the input member in the first direction about the input rotational axis; wherein the transfer device is powered by the energy harvesting arrangement.

2. The lock device according to item 1, wherein the input member comprises an engaging structure; wherein the output member comprises an engageable structure arranged to be engaged by the engaging structure; wherein the transfer device is constituted by a blocking device movable between a blocking state, in which the blocking device blocks the output member from rotating about the output rotational axis, and an unblocking state, in which the output member is allowed to rotate about the output rotational axis; and wherein the engaging structure is rotatable about the input rotational axis through an angular clearance prior to engaging the engageable structure.

3. The lock device according to item 2, wherein the angular clearance is 45° to 135°, such as 80° to 100°, such as 90°, about the input rotational axis.

4. The lock device according to item 1, wherein the transfer device is constituted by a coupling device movable between a decoupling state, in which the input member is decoupled from the output member, and a coupling state, in which the input member is coupled to the output member.

5. The lock device according to item 1, wherein transfer device is constituted by a blocking and coupling device, the blocking and coupling device comprising a blocking part movable between a blocking state, in which the blocking part blocks the output member from rotating about the output rotational axis, and an unblocking state, in which the output member is allowed to rotate about the output rotational axis; and a coupling part movable between a decoupling state, in which the input member is decoupled from the output member, and a coupling state, in which the input member is coupled to the output member; wherein the coupling part is arranged to be moved between the decoupling state and the coupling state in common with a movement of the blocking part between the blocking state and the unblocking state.

6. The lock device according to item 1, further comprising a Geneva mechanism having a rotatable drive wheel and a rotatable driven wheel, wherein the drive wheel is rotatable by rotation of the input member about the first rotational axis when the transfer device adopts the unlocking state, wherein the drive wheel cannot be rotated by rotation of the input member about the first rotational axis when the transfer device adopts the locking state, and wherein the output member is constituted by the driven wheel.

7. The lock device according to item 6, further comprising a differential gear, the differential gear comprising a rotatable differential input, connected to, coupled to, integrally formed with, or constituted by the input member; a rotatable differential output, connected to, coupled to, integrally formed with, or constituted by the drive wheel; and a rotatable ring gear; wherein the differential gear is configured to transmit a rotation of the differential input to a rotation of the differential output when the ring gear is blocked and to not transmit a rotation of the differential input to a rotation of the differential output when the ring gear is unblocked; and wherein the transfer device is constituted by a blocking device movable between a blocking state, in which the blocking device blocks the ring gear, and an unblocking state, in which the blocking device unblocks the ring gear.

8. The lock device according to any of the preceding items, further comprising a handle connected to, or integrally formed with, the input member.

9. The lock device according to any of the preceding items, further comprising a latch connected to, or integrally formed with, the output member.

10. The lock device according to any of the preceding items, wherein the energy harvesting arrangement comprises an electric generator; a drive member arranged to drive the electric generator, the drive member being displaceable by means of the input member from a starting position to a releasing position; an elastic element arranged to store mechanical energy from the displacement of the drive member from the starting position to the releasing position; and a release mechanism arranged to release mechanical energy stored in the elastic element to a returning displacement of the drive member when the drive member reaches the releasing position.

11. The lock device according to item 8, wherein the drive member is displaceable by means of a rotation about the input rotational axis and wherein an angular distance about the input rotational axis between the starting position and the releasing position is less than 90°.

12. Electronic locking system comprising a lock device according to any of the preceding items and an electronic access control device powerable by the energy harvesting arrangement.

13. Method for operating a lock device of an electronic locking system, the method comprising manually rotating an input member a first angular distance in a first direction about an input rotational axis while harvesting energy from the rotation by an energy harvesting arrangement; moving a selective transfer device from a locking state, in which the output member cannot be rotated about an output rotational axis by means of rotation of the input member about the input rotational axis, to an unlocking state, in which the output member can be rotated about the output rotational axis by means of rotation of the input member about the input rotational axis, with energy from the energy harvesting arrangement; and rotating the output member about the output rotational axis by manually rotating the input member a second angular distance, beyond the first angular distance, in the first direction about the input rotational axis.

14. The method according to item 13, wherein the rotation of the input member the first angular distance comprises rotating an engaging structure of the input member through an angular clearance relative to an engageable structure of the output member; and the moving of the transfer device comprises moving a transfer device constituted by a blocking device from a blocking position, in which the blocking device blocks the output member from rotating about the output rotational axis, to an unblocking position, in which the output member is allowed to rotate about the output rotational axis.

15. The method according to item 13, wherein the moving of the transfer device comprises moving a transfer device constituted by a coupling device from a decoupling position, in which the input member is decoupled from the output member, to a coupling position, in which the input member is coupled to the output member.

BRIEF DESCRIPTION OF THE DRAWINGS

Further details, advantages and aspects of the present disclosure will become apparent from the following embodiments taken in conjunction with the drawings, wherein:

FIG. 3b: schematically represents a front view of the lock device in FIG. 3a;

FIG. 4b: schematically represents a front view of the lock device in FIG. 4a;

FIG. 5b: schematically represents a front view of the lock device in FIG. 5a;

DETAILED DESCRIPTION

Figure 1:
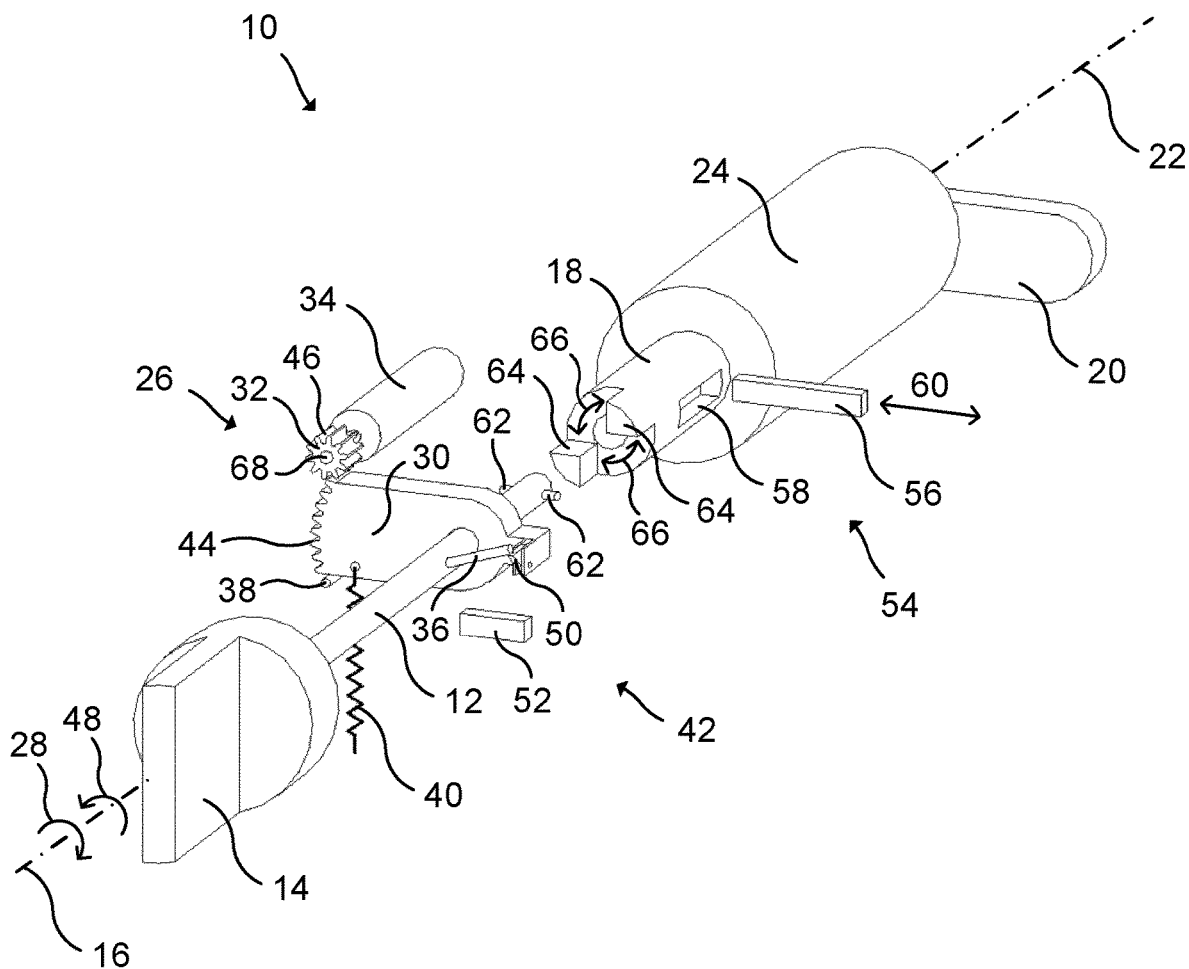
FIG. 1: schematically represents a perspective view of a lock device.

In the following, a lock device for an electronic locking system where the lock device comprises an energy harvesting arrangement; an electronic locking system comprising the lock device, and a method for operating a lock device of an electronic locking system, will be described. The same reference numerals will be used to denote the same or similar structural features.

FIG. 1 schematically represents a perspective view of one example of a lock device 10 according to the present disclosure. The lock device 10 of this example comprises an input member 12, here constituted by a handle shaft, and a handle 14, here constituted by a knob, fixedly connected to the input member 12 and for manually manoeuvring the input member 12. The handle 14 may for example alternatively be constituted by an elongated handle. The input member 12 is arranged to rotate about an input rotational axis 16. The lock device 10 in FIG. 1 may for example be used for a cabinet lock.

The lock device 10 of the example in FIG. 1 further comprises an output member 18, here constituted by a latch shaft, and a latch 20 fixedly connected to the output member 18. The output member 18 is arranged to rotate about an output rotational axis 22. In the example in FIG. 1, the output rotational axis 22 is concentric with the input rotational axis 16 but this relationship may be different, e.g. including inclined or offset relationships. The output member 18 is supported for rotation about the output rotational axis 22 by means of a bearing device 24.

The lock device 10 of the example in FIG. 1 further comprises an energy harvesting arrangement 26. The energy harvesting arrangement 26 is configured to harvest energy from rotation of the input member 12 in a first direction 28 about the input rotational axis 16. Many types of energy harvesting arrangements are possible and the present disclosure is not limited to the specific design in FIG. 1. For example, a direct drive energy harvesting arrangement may alternatively be used with the lock device 10 in FIG. 1.

The energy harvesting arrangement 26 of the example in FIG. 1 comprises a drive member 30, a driven member 32, an electric generator 34, a drive pin 36, a stop pin 38, an elastic element 40 and a release mechanism 42. The drive member 30 is constituted by a rigid piece arranged to rotate relative to the input member 12 about the input rotational axis 16. The drive member 30 comprises drive teeth 44 for driving driven teeth 46 of the driven member 32, here implemented as a gear wheel. The driven member 32 is arranged to drive the electric generator 34. In this example, the driven member 32 is coupled to a shaft 68 of the electric generator 34. The drive pin 36 is fixed to the input member 12.

The elastic element 40 is here implemented as a tension spring. In the state of the energy harvesting arrangement 26 illustrated in FIG. 1, the elastic element 40 is tensioned, i.e. preloaded, and rotationally forces the drive member 30 in a second direction 48, opposite to the first direction 28, about the input rotational axis 16 against the stop pin 38. Mechanical energy is stored in the elastic element 40 as the drive member 30 rotates in the first rotational direction 28 about the input rotational axis 16. In this example, the tension in the elastic element 40 is increased.

The stop pin 38 may be replaced by alternative stopping structures. Alternatively, the stop pin 38 may be removed and the drive member 30 can be positioned in the position illustrated in FIG. 1 by a resting position (i.e. in an unloaded state) of the elastic element 40.

The release mechanism 42 of the example in FIG. 1 comprises a release member 50 connected to the drive member 30 and a stationary release member activator 52, here exemplified as a block. The release member 50 is rotatable about a hinge between an extended position (as illustrated in FIG. 1) and a retracted position. The energy harvesting arrangement according to the present disclosure does however not need to comprise a release mechanism 42.

The lock device 10 of the example in FIG. 1 further comprises a transfer device 54. The transfer device 54 can be selectively moved, e.g. based on a granted access control procedure, from a locking state, in which the output member 18 cannot be rotated about the output rotational axis 22 by means of rotation of the input member 12 about the input rotational axis 16, and an unlocking state, in which the output member 18 can be rotated about the output rotational axis 22 by means of rotation of the input member 12 about the input rotational axis 16. The transfer device 54 can be powered by the energy harvesting arrangement 26, either directly or indirectly, e.g. via a power storage (not shown) such as a capacitor, supercapacitor, rechargeable battery etc.

In the example in FIG. 1, the transfer device 54 is constituted by a blocking device 56. The locking state of the transfer device 54 is constituted by a blocking state of the blocking device 56 and the unlocking state of the transfer device 54 is constituted by an unblocking state of the blocking device 56 (as illustrated in FIG. 1).

A blocking device according to the present disclosure is not limited to the type in FIG. 1. Rather, the blocking device 56 in FIG. 1 merely constitutes one of numerous examples of blocking devices according to the present disclosure. In FIG. 1, the blocking device 56 is arranged to move into a recess 58 in the output member 18 to adopt the blocking state and to move out from the recess 58 to adopt the unblocking state. Movements of the blocking device 56 are illustrated by arrow 60. An actuator (not shown) may be used to drive the blocking device 56 between the blocking state and the unblocking state.

In the example in FIG. 1, the input member 12 comprises an engaging structure 62 and the output member 18 comprises an engageable structure 64 arranged to be engaged by the engaging structure 62. In FIG. 1, the engaging structure 62 is arranged at the distal end of the input member 12 and the engageable structure 64 is arranged at the proximal end of the output member 18. However, the engaging structure 62 and/or the engageable structure 64 may be arranged at alternative locations, e.g. not necessarily distal/proximal. Furthermore, in FIG. 1, the input member 12 is distanced from the output member 18 to facilitate the view of the engaging structure 62 and the engageable structure 64.

The engaging structure 62 is here exemplified as two engaging protrusions and the engageable structure 64 is here exemplified as two engageable protrusions. Each engaging protrusion is constituted by a pin extending radially with respect to the input rotational axis 16. Each engageable protrusion is constituted by a stop extending parallel to the output rotational axis 22.

The engaging structure 62 and the engageable structure 64 define an angular clearance 66 or sector through which engaging structure 62 can rotate about the input rotational axis 16 before the engageable structure 64 is engaged. In the example of FIG. 1, the angular clearance 66 is 90°. However, the angular clearance 66 can be made either larger or smaller.

In FIG. 1, the input member 12 is positioned in a starting position or in a neutral position. FIG. 1 further denotes a vertical axis Z and two horizontal axes X and Y for referencing purposes. In FIG. 1, the lock device 10 is generally horizontally oriented. However, the lock device 10 may be oriented arbitrarily in space.

One example of a method of operating the lock device 10 in FIG. 1 will now be described. When the blocking device 56 is positioned in the blocking state, the output member 18 is blocked from rotating about the output rotational axis 22. However, the input member 12 may be rotated 90° about the input rotational axis 16, e.g. such that the engaging structure 62 rotates through the angular clearance 66, when the blocking device 56 is positioned in the blocking state. The input member 12 can therefore always be rotated 90°, and energy from this rotation can always be harvested by the energy harvesting arrangement 26, regardless of the state adopted by the blocking device 56.

By manually rotating the input member 12 in the first direction 28 about the input rotational axis 16, e.g. by manually grabbing and turning the handle 14, the drive pin 36 pushes the release member 50, which is in the extended position, such that the drive member 30 rotates in the first direction 28 about the input rotational axis 16. The rotation of the drive member 30 is counteracted by the elastic element 40.

As the drive member 30 is initially rotated in the first direction 28 about the input rotational axis 16, the electric generator 34 is driven via the drive teeth 44, the driven teeth 46 and the driven member 32. The energy generated by the electric generator 34 during this initial rotation may be used to wake up and perform an access control procedure of an access control device (described in FIG. 8), for example by means of BLE communication.

When the input member 12 has rotated further in the first direction 28 about the input rotational axis 16, such as approximately 80° from the starting position, the release member 50 is brought into contact with the release member activator 52 and the release member activator 52 pushes the release member 50 from the extended position into a retracted position. As a consequence, the engagement between the drive pin 36 and the release member 50 is lost and the release mechanism 42 is released.

Upon release, the elastic element 40 pulls the drive member 30 to rotate in the second direction 48 about the input rotational axis 16 which generates a relatively fast rotation of the driven member 32. The drive member 30 is then stopped by the stop pin 38 (or stopped when the elastic element 40 adopts the resting position). A relatively high amount of energy is thereby harvested by the energy harvesting arrangement 26. If the access control procedure results in granted access, the blocking device 56 is moved from the blocking state to the unblocking state, e.g. by means of the energy collected by the release of the release mechanism 42 or by means of energy collected by one or more earlier releases of the release mechanism 42. The energy harvested by the energy harvesting arrangement 26 during the release of the release mechanism 42 may be sufficient to move the blocking device 56 from the blocking state to the unblocking state, and back to the blocking state. A part of the harvested energy may also be stored and used for one or more subsequent movements of the blocking device 56 from the blocking state to the unblocking state, and back to the blocking state. The harvested energy may also be used for other tasks and/or for waking up the access control device and carry out the access control procedure a second time.

For a cabinet lock, the energy harvested by the energy harvesting arrangement 26 during the release of the release mechanism 42 may be just a little bit more than required to move the blocking device 56 from the blocking state to the unblocking state, and back to the blocking state. According to one variant, e.g. in a cabinet lock, the excess energy may be stored and used to wake up an access control device and to unblock the blocking device 56 during a subsequent passage. The energy harvested during the subsequent passage may be used to block the blocking device 56 after the subsequent passage.

For some implementations, such as door handles, a relatively large power storage may be used. The energy harvesting arrangement 26 may in this case repetitively charge the power storage such that the power storage remains substantially fully charged. In this case, the blocking device 56 may be moved from the blocking state to the unblocking state (or an alternative transfer device 54 may be moved from the locking state to the unlocking state) before rotation of the handle 14. The energy harvested can thereby be used for a later passage.

When the input member 12 has rotated 90° in the first direction 28 about the input rotational axis 16, the engaging structure 62 of the input member 12 starts to engage the engageable structure 64 of the output member 18. That is, the engaging structure 62 is brought into contact with the engageable structure 64. Since the blocking device 56 now adopts the unblocking state, further rotation of the input member 12 in the first direction 28 about the input rotational axis 16, for example from 90° to 180°, causes the output member 18, and consequently the latch 20 to be rotated. In this way, the lock device 10 can be unlocked. The first rotation of 90° from the starting position in the first direction 28 about the input rotational axis 16 of the input member 12 constitutes a first angular distance and the second rotation from 90° to 180° from the starting position in the first direction 28 about the input rotational axis 16 of the input member 12 constitutes a second angular distance, beyond the first rotational distance.

Depending on the time required by the access control device to wake up and carry out the access control procedure, it may be the case that a very fast rotation of the input member 12 may cause a stop in the rotation of the input member 12. That is, the input member 12 may be moved through the entire angular clearance 66, such that the engaging structure 62 is brought into engagement with the engageable structure 64, before the blocking device 56 has moved from the blocking state to the unblocking state. In this case, the user has to wait for completion of the access control procedure before the blocking device 56 is moved to the unblocking state and the rotation of the input member 12 can proceed.

If the lock device 10 is to be locked again, the input member 12 is rotated in the second direction 48 about the input rotational axis 16. During the initial returning rotation, e.g. from 180° from the starting position to 90° from the starting position, the engaging structure 62 of the input member 12 moves through the angular clearance 66. During the subsequent returning rotation, e.g. from 90° from the starting position to the starting position, the output member 18, and consequently the latch 20, is rotated together with the input member 12. Just prior to returning to the starting position, the drive pin 36 rides over the release member 50 such that the drive member 30 can be rotated again. In other words, the energy harvesting arrangement 26 is reset. Once it is determined that the latch 20 has been locked again, for example by means of a position sensor (not shown) reading a value indicative of the position of the latch 20 or of the input member 12, the blocking device 56 is moved from the unblocking state back to the blocking state. In cases where the blocking device 56 comprises, for example, a spring loaded actuator pin for engaging the recess 58, movement of the blocking device 56 from the unblocking state to the blocking state can be actuated earlier such that the actuator pin "jumps" into the recess 58 when the output member 18 is rotationally aligned with the blocking device 56.

Figure 2:
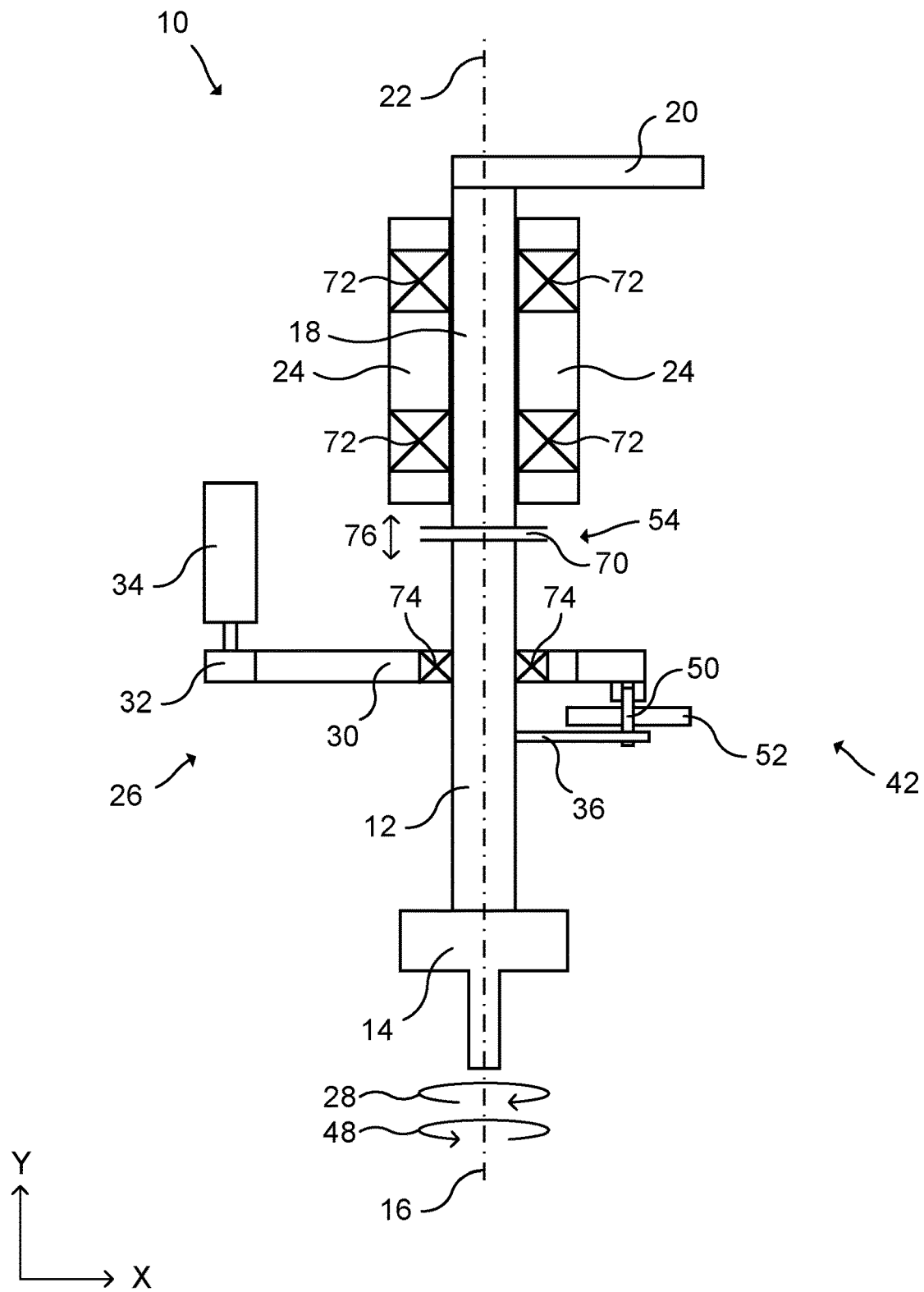
FIG. 2: schematically represents a top view of a further lock device.

FIG. 2 schematically represents a top view of a further example of a lock device 10 according to the present disclosure. The lock device 10 in FIG. 2 differs from the lock device 10 in FIG. 1 by comprising a transfer device 54 constituted by a coupling device 70. Furthermore, the lock device 10 in FIG. 2 does not comprise the engaging structure 62 and the engageable structure 64 according to FIG. 1. The energy harvesting arrangement 26 in FIG. 2 is exemplified with the same non-limiting example of energy harvesting arrangement 26 as used in FIG. 1. A direct drive energy harvesting arrangement may alternatively be used with the lock device 10 in FIG. 2, for example in cabinet lock applications.

In FIG. 2, the bearing device 24 is schematically illustrated with a cross-sectional view and two bearings 72 of the bearing device 24 can be seen. FIG. 2 further shows that the energy harvesting arrangement 26 comprises a bearing 74 for allowing the drive member 30 to rotate relative to the input member 12.

The coupling device 70 in FIG. 2 is implemented as a clutch. The coupling device 70 is movable between a decoupling state, in which the input member 12 is decoupled from the output member 18, and a coupling state, in which the input member 12 is coupled to the output member 18. In this manner, also the coupling device 70 constitutes a transfer device 54 that is selectively movable, e.g. based on a granted access control procedure, between a locking state (the decoupling state), in which the output member 18 cannot be rotated by means of rotation of the input member 12 about the input rotational axis 16, and an unlocking state (the coupling state), in which the output member 18 can be rotated about the output rotational axis 22 by means of rotation of the input member 12 in the first direction 28 about the input rotational axis 16. Movements of the coupling device 70 are illustrated by arrow 76.

The coupling device 70 is powered by the energy harvesting arrangement 26, either directly or indirectly, e.g. via a power storage (not shown) such as a capacitor or supercapacitor. An actuator (not shown) may be used to drive the coupling device 70 between the decoupling state and the coupling state. In FIG. 2, the input member 12 is positioned in a starting position or in a neutral position.

One example of a method of operating the lock device 10 in FIG. 2 will now be described. When the coupling device 70 is positioned in the decoupling state, rotation of the input member 12 about the input rotational axis 16 is not transferred to rotation of the output member 18. The input member 12 can therefore be rotated endlessly around the input rotational axis 16 when the coupling device 70 adopts the decoupling state, and energy from this rotation can be harvested by the energy harvesting arrangement 26.

By manually rotating the input member 12 in the first direction 28 about the input rotational axis 16, e.g. by manually grabbing and turning the handle 14, energy can be harvested during an initial rotation as described in connection with FIG. 1. The energy generated by the electric generator 34 during this initial rotation may be used to wake up and perform an access control procedure of the access control device.

When the input member 12 has rotated further in the first direction 28 about the input rotational axis 16, such as approximately 80° from the starting position, the release mechanism 42 is released as described in connection with FIG. 1. Upon release, a relatively high amount of energy is harvested by the energy harvesting arrangement 26. The release mechanism 42 also ensures that a minimum amount of energy can be harvested by the energy harvesting arrangement 26. Thus, a relatively high and consistent amount of energy is harvested by the energy harvesting arrangement 26 upon release of the release mechanism 42. If the access control procedure results in granted access, the coupling device 70 is moved from the illustrated decoupling state to the coupling state, e.g. by means of the energy collected by the release of the release mechanism 42. The energy harvested by the energy harvesting arrangement 26 during the release of the release mechanism 42 may be sufficient to perform an access control procedure by the access control device and to move the coupling device 70 from the decoupling state to the coupling state, and back to the decoupling state.

Once the coupling device 70 has moved to the coupling state, any rotation of the input member 12 about the input rotational axis 16 is transferred to a rotation of the output member 18, and consequently of the latch 20, about the output rotational axis 22. In this way, the lock device 10 can be unlocked. In FIG. 2, a first angular distance may be constituted by a rotation of the input member 12 in the first direction 28 about the input rotational axis 16 from the starting position to a transfer position, i.e. the angular position of the input member 12 about the input rotational axis 16 where the coupling device 70 adopts the coupling state. In many cases, the transfer position is approximately 90° from the starting position. A second angular distance may be constituted by a rotation of the input member 12 in the first direction 28 about the input rotational axis 16 from the transfer position to approximately 180° from the starting position, e.g. between 90° and 180°. Thus, the second angular distance may be 90°. In some cases, the transfer position is approximately 45° from the starting position and the second angular distance is constituted by a rotation of the input member 12 in the first direction 28 about the input rotational axis 16 from the transfer position to approximately 90° from the starting position, e.g. between 45° and 90°.

The exact position of the transfer position may vary, for example depending on the rotational speed of the input member 12 about the input rotational axis 16 and on the movement speed of the coupling device 70 from the decoupling state to the coupling state. In some cases, if the input member 12 is moved very fast, the second angular distance may be constituted by a rotation of the input member 12 in the first direction 28 about the input rotational axis 16 from 120° to 210°.

If the lock device 10 is to be locked again, the input member 12 may simply be rotated approximately 90° in the second direction 48 about the input rotational axis 16. Since the coupling device 70 is in the coupling state, the output member 18, and consequently the latch 20, is rotated together with the input member 12. Once it is determined that the latch 20 has been locked again, for example by means of a position sensor (not shown) reading a value indicative of the position of the latch 20, the coupling device 70 is moved from the coupling state back to the decoupling state.

Figure 3A:
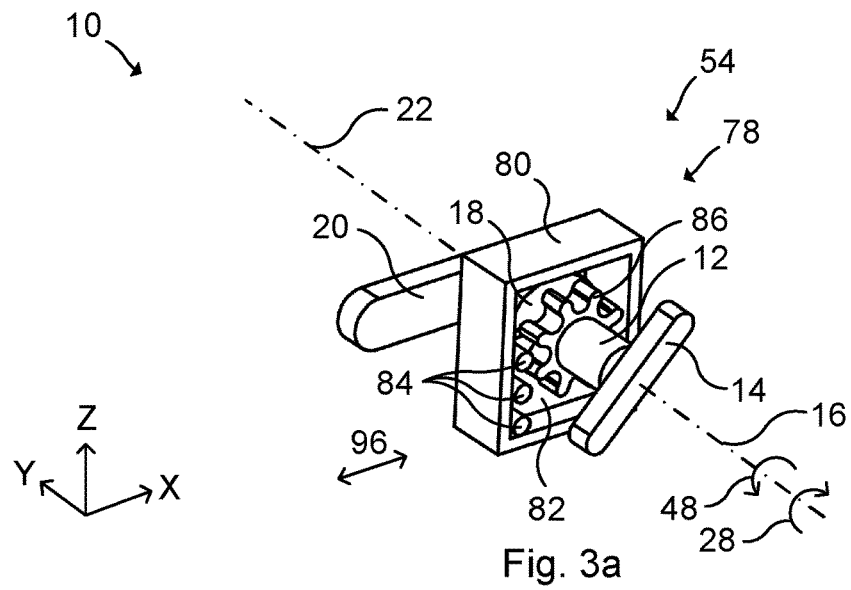
FIG. 3a: schematically represents a perspective view of a further lock device in a locking state.
Figure 3B:
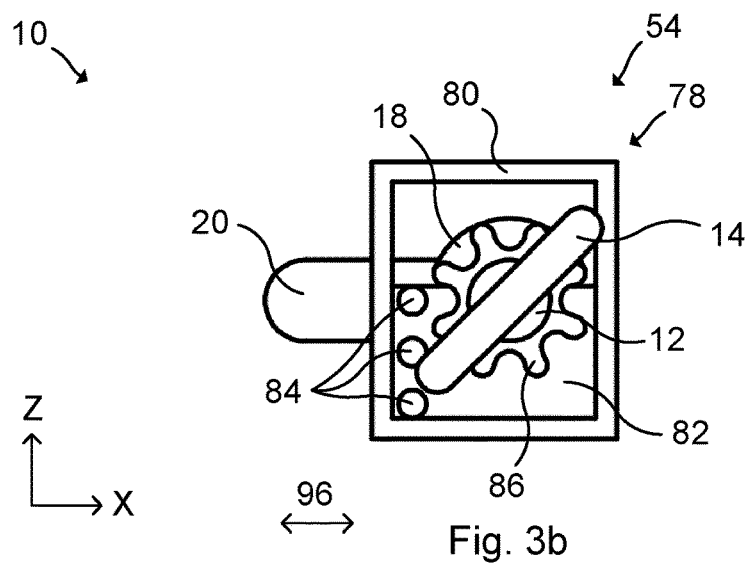
Figure 3C:
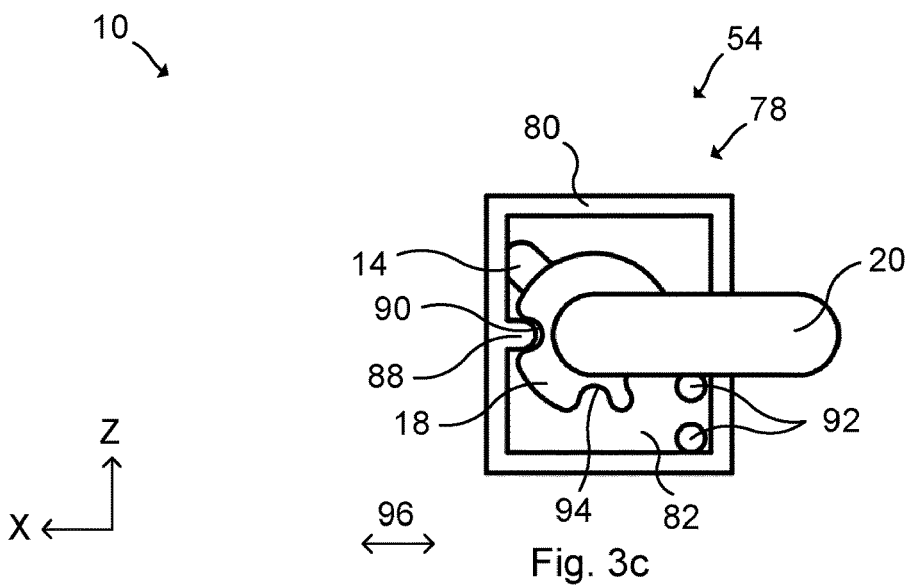
FIG. 3c: schematically represents a rear view of the lock device in FIGS. 3a and 3b.

FIG. 3a schematically represents a perspective view of a further example of a lock device 10 according to the present disclosure, FIG. 3b schematically represents a front view of the lock device 10 in FIG. 3a, and FIG. 3c schematically represents a rear view of the lock device 10 in FIGS. 3a and 3b. Mainly differences with respect to FIGS. 1 and 2 will be described.

With collective reference to FIGS. 3a, 3b and 3c, the lock device 10 comprises a transfer device 54 constituted by a blocking and coupling device 78. The blocking and coupling device 78 is movable between a locking state, in which the output member 18 cannot be rotated about the output rotational axis 22 by means of rotation of the input member 12 about the input rotational axis 16, and an unlocking state, in which the output member 18 can be rotated about the output rotational axis 22 by means of rotation of the input member 12 in the first direction 28 about the input rotational axis 16. The locking device 10 of this example also comprises an energy harvesting arrangement (not shown) according to the present disclosure configured to generate electric energy from rotation of the input member 12 in the first direction 28 about the input rotational axis 16. The energy harvesting arrangement may be of the type in FIGS. 1 and 2, or of alternative types according to the present disclosure, for example a direct drive energy harvesting arrangement. The blocking and coupling device 78 is powered by the energy harvesting arrangement.

In FIGS. 3a, 3b and 3c, the blocking and coupling device 78 is in the locking state. The blocking and coupling device 78 comprises a blocking part 80 and a coupling part 82. The blocking part 80 is movable between a blocking state, in which the blocking part 80 blocks the output member 18 from rotating about the output rotational axis 22, and an unblocking state, in which the output member 18 is allowed to rotate about the output rotational axis 22. The coupling part 82 is movable between a decoupling state, in which the input member 12 is decoupled from the output member 18, and a coupling state, in which the input member 12 is coupled to the output member 18.

FIGS. 3a, 3b and 3c illustrate the blocking part 80 in the blocking state and the coupling part 82 in the decoupling state. These states constitute the locking state of the blocking and coupling device 78. Moreover, in this example, the blocking state of the blocking part 80 is constituted by a blocking position and the decoupling state of the coupling part 82 is constituted by a decoupling position. The input member 12 and the output member 18 are journaled on a common axis, but are not coupled to each other in the locking state of the lock device 10 in FIGS. 3a, 3b and 3c. Thus, in this example, the input rotational axis 16 is concentric with the output rotational axis 22.

With specific reference to FIG. 3b, the coupling part 82 comprises a plate and an input member engaging profile 84, here implemented as three pins. The input member 12 comprises an input member engageable profile 86, here implemented as teeth on the input member 12. In the illustrated decoupling state of the coupling part 82, the input member engaging profile 84 is separated from the input member engageable profile 86 (along the X-axis in FIG. 3b). As a consequence, rotation of the input member 12 about the input rotational axis 16 is not transmitted to a rotation of the output member 18 about the output rotational axis 22. The output member 18 is also blocked in the locking state of the lock device 10 in FIGS. 3a, 3b and 3c. The input member 12 is however free to rotate about the input rotational axis 16 and energy can be harvested by this rotation.

With specific reference to FIG. 3c, the blocking part 80 further comprises a frame and a blocking part engaging profile 88. The frame and the plate are oriented perpendicular to the input rotational axis 16. The blocking part engaging profile 88 is here implemented as a protrusion that protrudes inwardly from the frame (i.e. towards the input rotational axis 16). The output member 18 comprises a blocking part engageable profile 90, here implemented as a recess in the output member 18. In the illustrated blocking state of the blocking part 80, the blocking part engaging profile 88 engages the blocking part engageable profile 90. As a consequence, the output member 18 is blocked from rotating about the output rotational axis 22.

FIG. 3c further shows that the coupling part 82 comprises an output member engaging profile 92, here implemented as three pins, and that the output member 18 comprises an output member engageable profile 94, here implemented as teeth or recesses in the output member 18. In the illustrated decoupled state of the coupling part 82, the output member engaging profile 92 is separated from the output member engageable profile 94 (in the X-direction). The output member engaging profile 92 is arranged on the opposite side of the coupling part 82 with respect to the input member engaging profile 84.

The plate is movable within the frame in a direction perpendicular to the input rotational axis 16 (along the Z-axis in FIGS. 3a, 3b and 3c). For this purpose, the plate may be guided in tracks (not visible) in the frame. The coupling part 82 of this example may thus be referred to as a slider member.

The blocking and coupling device 78 is selectively movable, e.g. based on a granted access control procedure, between the locking state to an unlocking state. More specifically, the blocking part 80 is movable between the blocking position to an unblocking position, as illustrated by arrow 96 (in the X-direction in this example). The movement of the blocking part 80 may be performed by means of an actuator (not shown) of the blocking and coupling device 78 powered by the energy harvesting arrangement, either directly or indirectly.

Figure 4A:
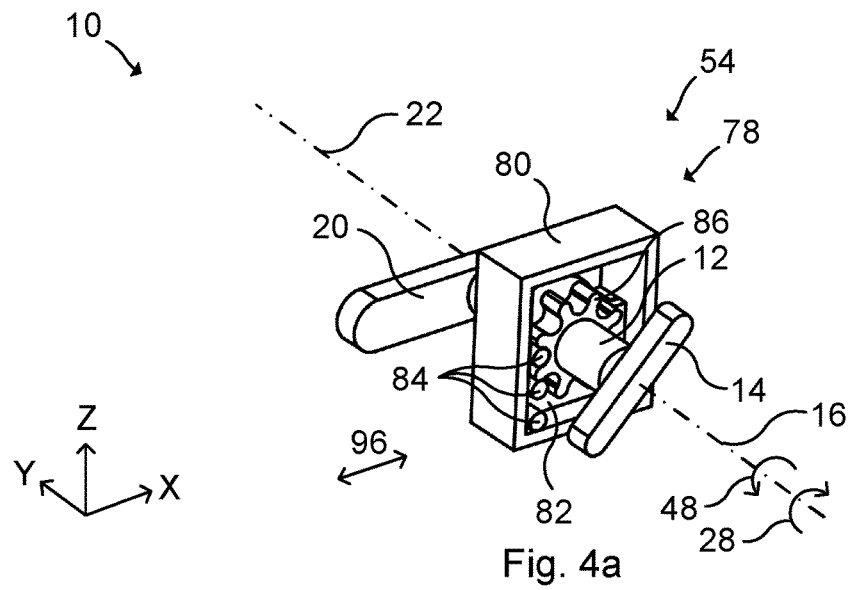
FIG. 4a: schematically represents a perspective view of the lock device in FIGS. 3a to 3c in an unlocking state.
Figure 4B:
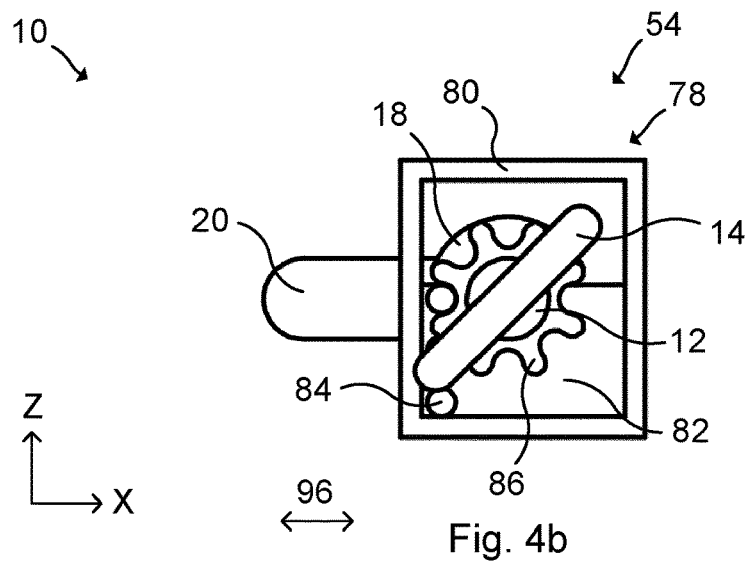
Figure 4C:
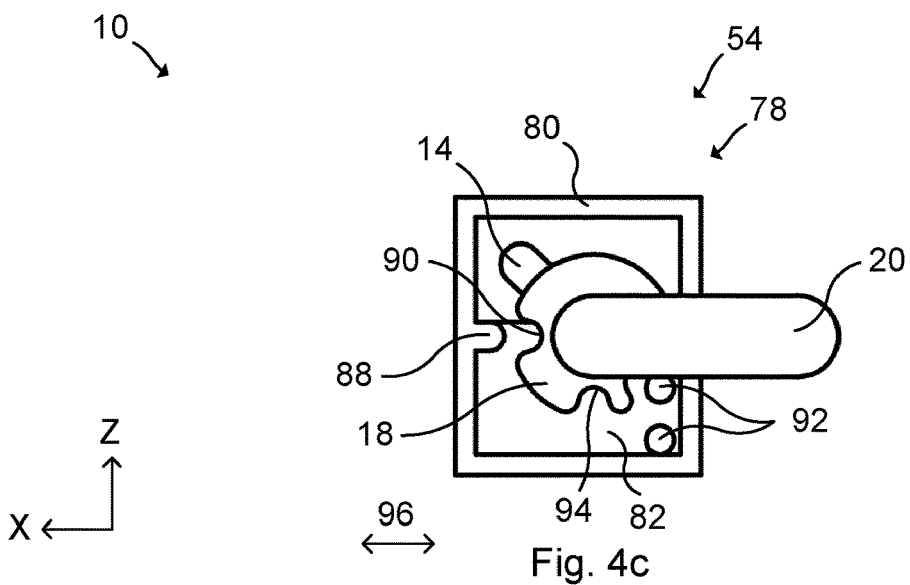
FIG. 4c: schematically represents a rear view of the lock device in FIGS. 4a and 4b.
Figure 5A:
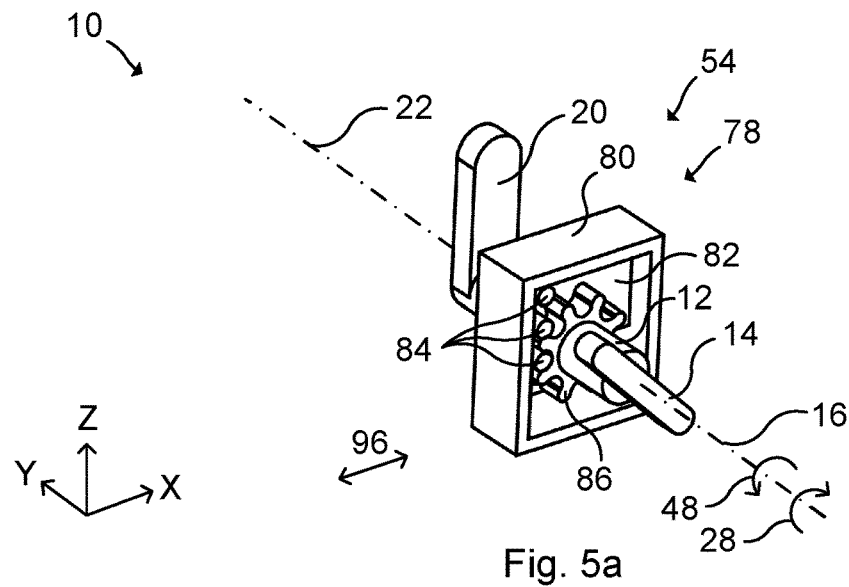
FIG. 5a: schematically represents a perspective view of the lock device in FIGS. 3a to 4c in an opened state.
Figure 5B:
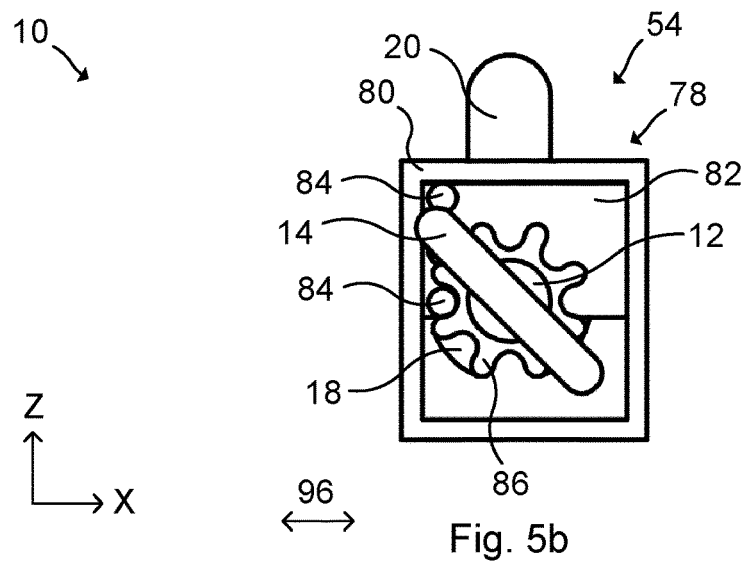
Figure 5C:
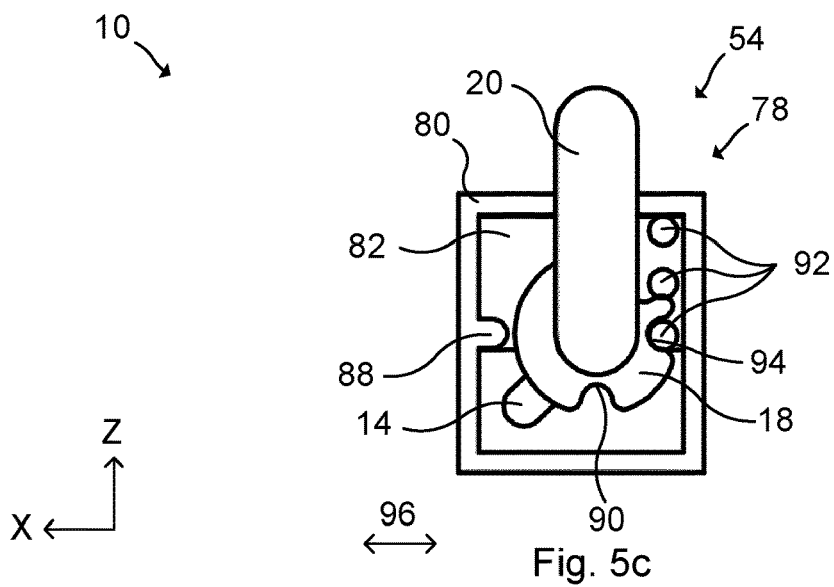
FIG. 5c: schematically represents a rear view of the lock device in FIGS. 5a and 5b.

FIG. 4a schematically represents a perspective view of the lock device 10, FIG. 4b schematically represents a front view of the lock device 10 in FIG. 4a, and FIG. 4c schematically represents a rear view of the lock device in FIGS. 4a and 4b. In FIGS. 4a, 4b and 4c, the lock device 10 is in an unlocking state. FIG. 5a schematically represents a perspective view of the lock device 10 in FIGS. 3a to 4c, FIG. 5b schematically represents a front view of the lock device 10 in FIG. 5a, and FIG. 5c schematically represents a rear view of the lock device 10 in FIGS. 5a and 5b. In FIGS. 5a, 5b and 5c, the lock device 10 is also in an unlocking state and the latch 20 has been moved from a locked position to an unlocked position.

One example of a method of operating the lock device 10 in FIGS. 3, 4 and 5 will now be described. When the coupling part 82 is positioned in the decoupling position according to FIGS. 3a, 3b and 3c, input member 12 is free to rotate about the input rotational axis 16 and the rotation is not transferred to the output member 18. The input member 12 can be rotated endlessly around the input rotational axis 16 when the blocking and coupling device 78 adopts the locking state, and energy from this rotation can be harvested by an energy harvesting arrangement.

Moreover, when the blocking part 80 is positioned in the blocking position according to FIGS. 3a, 3b and 3c, the output member 18 is blocked from rotating about the output rotational axis 22.

By manually rotating the input member 12 in the first direction 28 about the input rotational axis 16, e.g. by manually grabbing and turning the handle 14, energy can be harvested and used by the electric generator to wake up and perform an access procedure of the access control device. If the access procedure results in granted access, the actuator is powered by the energy harvesting arrangement and actuates a movement in direction 96 of the blocking part 80 from the blocking state in FIGS. 3a, 3b and 3c to the unblocking state in FIGS. 4a, 4b and 4c. Since the coupling part 82 is arranged within the blocking part 80, also the coupling part 82 moves together with the blocking part 80 at the same time. The coupling part 82 thereby moves from the decoupling state in FIGS. 3a, 3b and 3c to the coupling state in FIGS. 4a, 4b and 4c.

As shown in FIG. 4b, when the coupling part 82 adopts the coupling state, the input member engaging profile 84 of the coupling part 82 is brought into engagement with the input member engageable profile 86 of the input member 12. Moreover, as shown in FIG. 4c, when the blocking part 80 adopts the unblocking state, the blocking part engaging profile 88 of the blocking part 80 is disengaged from the blocking part engageable profile 90 of the output member 18.

When the blocking part 80 has adopted the unblocking state and the coupling part 82 has adopted the coupling state according to FIGS. 4a, 4b and 4c, i.e. when the blocking and coupling device 78 has adopted the unlocking state, rotation of the input member 18 about the input rotational axis 16 is transferred to a rotation of the output member 18, and consequently also of the latch 20, about the output rotational axis 22. Thus, in the unlocking state of the blocking and coupling device 78, the input member 12 rotates together with the output member 18.

More specifically, when the input member 18 is rotated in the first direction 28 about the input rotational axis 16, the engagement between the input member engageable profile 86 and the input member engaging profile 84 causes the plate of the coupling part 82 to move upwards (in the Z-direction). This is particularly illustrated in FIG. 5b. Furthermore, when the plate of the coupling part 82 is moved upwards, the engagement between the output member engaging profile 92 and the output member engageable profile 94 causes the output member 18, and consequently the latch 20, to rotate in the first direction 28 about the output rotational axis 22 from the locked position to the unlocked position. This is particularly illustrated in FIG. 5c. A Reverse procedure may then be carried out to lock the lock device 10 again.

Figure 6:
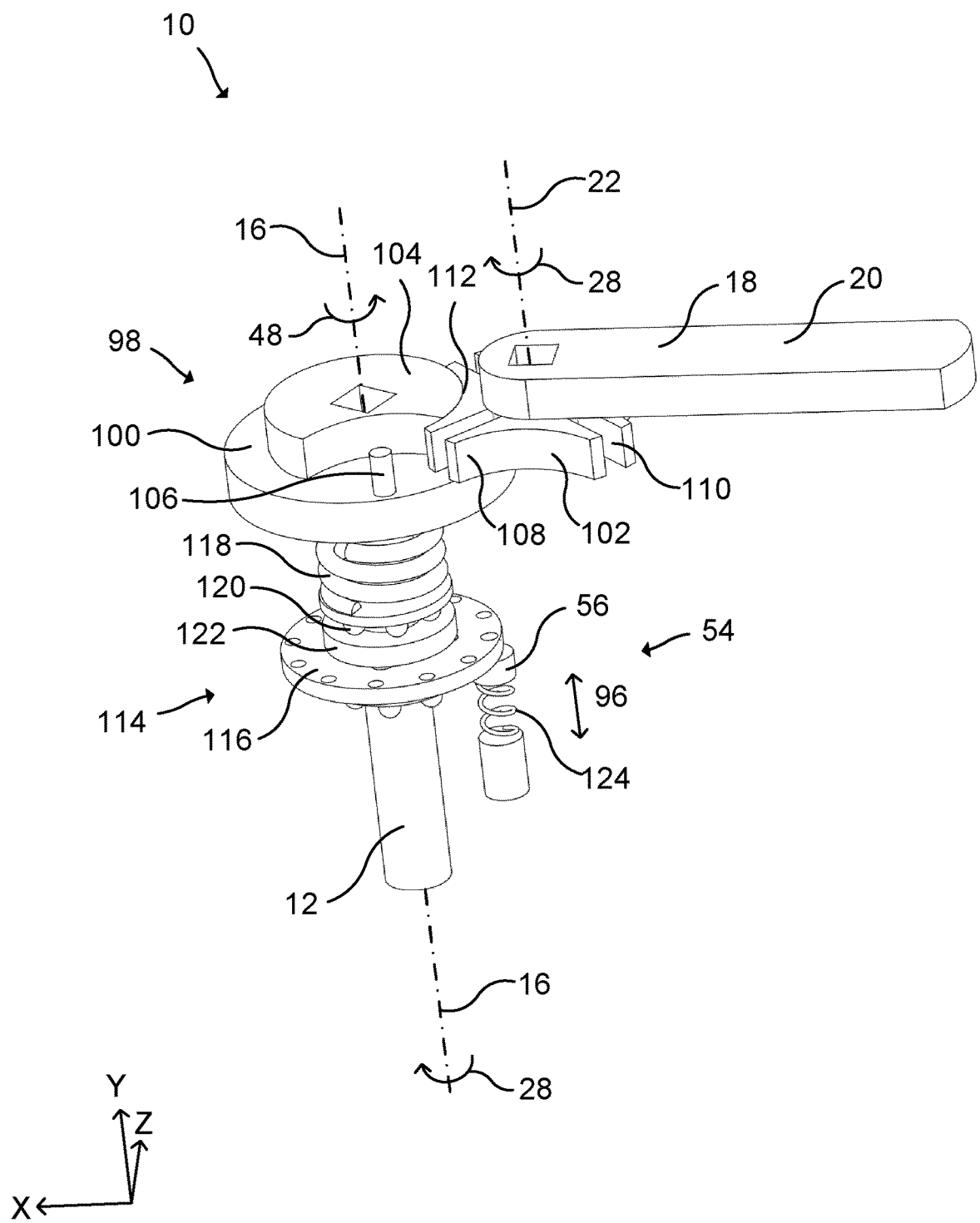
FIG. 6: schematically represents a perspective view of a further lock device.

FIG. 6 schematically represents a perspective view of a further example of a lock device 10 according to the present disclosure. The lock device 10 of this example comprises a Geneva mechanism 98 and an energy harvesting arrangement (not shown) configured to generate electric energy from rotation of the input member 12 about the input rotational axis 16. The energy harvesting arrangement may be of the type in FIGS. 1 and 2, or of alternative types according to the present disclosure, for example a direct drive energy harvesting arrangement.

The Geneva mechanism 98 comprises a drive wheel 100 and a driven wheel 102. The drive wheel 100 comprises a blocking disc 104 and a pin 106. The driven wheel 102 comprises a plurality of spokes 108, each comprising a slot 110. In the example of FIG. 6, the driven wheel 102 comprises four spokes 108 and four associated slots 110. However, the driven wheel 102 may comprise fewer or more spokes 108 and associated slots 110. The Geneva mechanism according to the present disclosure is not limited to the particular type shown in FIG. 6. Any type of Geneva mechanism configured to translate a continuous rotation of the drive wheel 100, e.g. through an angular range of between 90° and 180°, such as approximately 120°, to an intermittent rotation of the driven wheel 102, may be used.

In the example of FIG. 6, the drive wheel 100 is arranged to rotate about the input rotational axis 16. Thus, the drive wheel 100 is concentric with the input member 12. However, the drive wheel 100 may be arranged to rotate about a different axis, such as an axis offset from, or angled to, the input rotational axis 16.

The driven wheel 102 is arranged to rotate about the output rotational axis 22. In the example of FIG. 6, the driven wheel 102 and the latch 20 are fixedly connected and constitute an output member 18 according to the present disclosure.

The driven wheel 102 comprises a plurality of arced recesses 112 (four in FIG. 6), one between each pair of spokes 108. In the illustrated position of the Geneva mechanism in FIG. 6, the blocking disc 104 of the drive wheel 100 is received in one of the arced recesses 112 of the driven wheel 102. As a consequence, the driven wheel 102 cannot be rotated by manipulating the latch 20 about the output rotational axis 22. In other words, in the state of the Geneva mechanism in FIG. 6, the output member 18 is locked.

The lock device 10 of the example in FIG. 6 further comprises a differential gear 114, here exemplified as a ball differential. The present disclosure is however not limited to a differential gear constituted by a ball differential. A differential gear according to the present disclosure may for example alternatively be constituted by a planetary gear.

The differential gear 114 in the example of FIG. 6 comprises a differential input, a differential output and a ring gear 116. In this example the differential input is constituted by the input member 12 and the differential output is fixedly connected to the drive wheel 100. The lock device 10 also comprises a preload spring 118 encircling the differential output. One of two thrust bearings 120 and one of two ball bearing bushings 122 of the differential gear 114 can also be seen in FIG. 6.

The lock device 10 of the example in FIG. 6 further comprises a transfer device 54 constituted by a blocking device 56. The blocking device 56 of this example comprises an elastic element 124, here implemented as a compression spring, and is movable between a blocking state and an unblocking state, as indicated by arrow 96. In the blocking state of the blocking device 56, the blocking device 56 blocks the ring gear 116 from rotating about the input rotational axis 16. In the unblocking state, the blocking device 56 unblocks the ring gear 116 such that the ring gear 116 is free to rotate about the input rotational axis 16.

The blocking device 56 of the specific example in FIG. 6 is configured to block the ring gear 116 by engaging one of several holes in the ring gear 116. However, the blocking device 56 and the ring gear 116 may alternatively be configured such that the blocking device 56 can block the ring gear 116 in any rotational position. Thus, the holes in the ring gear 116 are optional. The blocking device 56 may be of any type to selectively block the ring gear 116, including for example a pin, a ratchet, or similar. When the ring gear 116 is blocked, torque can be transferred from the differential input to the differential output. Thus, when the ring gear 116 is blocked, the lock device 10 is unlocked.

FIGS. 7a-7d schematically represent top views of the lock device 10 in FIG. 6. More specifically, FIGS. 7a to 7d represents the Geneva mechanism 98 in different states.

With collective reference to FIGS. 6 and 7, one example of a method of operating the lock device 10 will now be described. When the blocking device 56 adopts the unblocking state, the differential gear 114 does not transfer any torque. In this case, rotation of the input member 12 about the input rotational axis 16 is transferred to a rotation of the ring gear 116 about the input rotational axis 16. When the blocking device 56 is in the unblocking state, the input member 12 can rotate endlessly about the input rotational axis 16. The locking state of the transfer device 54 is thereby constituted by the unblocking state of the blocking device 56 in this example.

By manually rotating the input member 12 in the first direction 28 about the input rotational axis 16, e.g. by manually grabbing and turning a handle 14 connected to the input member 12, energy is harvested by the energy harvesting arrangement. The energy generated by the electric generator (not shown) from this rotation can be used to wake up and perform an access control procedure of the access control device. If the access control procedure results in granted access, the blocking device 56 is moved from the unblocking state to the blocking state as illustrated by arrow 96 with power from the energy harvesting arrangement.

When the blocking device 56 adopts the blocking state, the ring gear 116 is blocked by the blocking device 56. As a consequence, torque from the differential input is transferred to the differential output. The unlocking state of the transfer device is thereby constituted by the blocking state of the blocking device 56 in this example. In FIG. 6, torque is transferred from the input member 12 to the drive wheel 100 of the Geneva mechanism 98. Since the differential gear 114 in this example is constituted by a ball differential, rotation of the input member 12 about the input rotational axis 16 in the first direction 28 is transferred to a rotation of the drive wheel 100 about the input rotational axis 16 in the second direction 48.

Figure 7A:
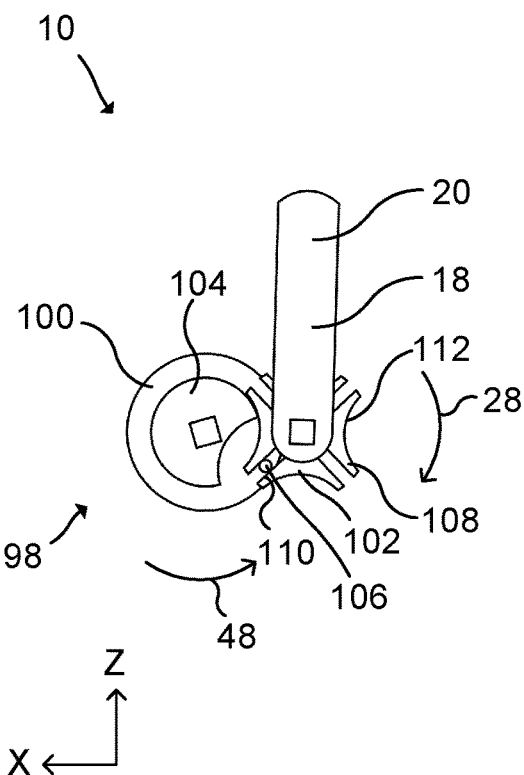
FIGS. 7a-7d: schematically represent top views of the lock device in FIG. 6.
Figure 7B:
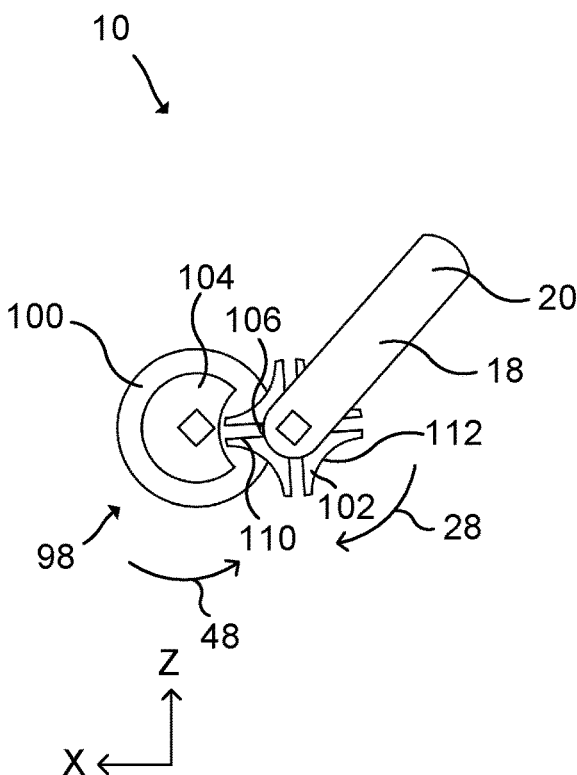

As the drive wheel 100 starts to rotate in the second direction 48 about the input rotational axis 16, the pin 106 moves into one of the slots 110 of the driven wheel 102. This is illustrated in FIG. 7a. As the drive wheel 100 rotates further in the second direction 48 about the input rotational axis 16, the pin 106 engages the slot 110 such that the driven wheel 102 starts to rotate in the first direction 28 about the output rotational axis 22. As a consequence, also the latch 20 is rotated. This is illustrated in FIG. 7b.

Figure 7C:
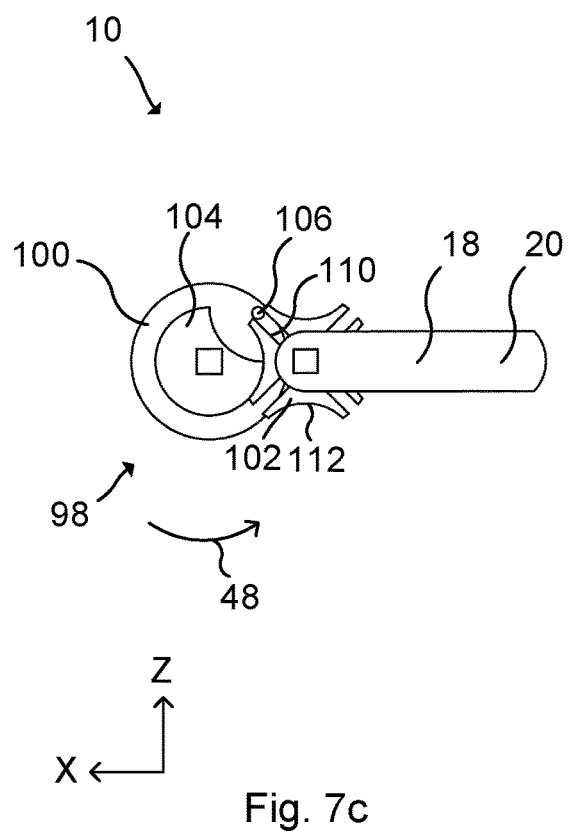
Figure 7D:
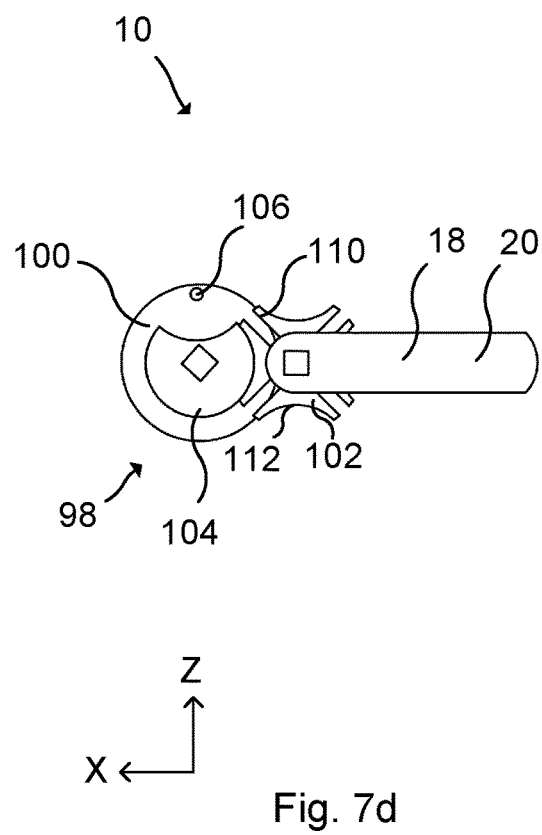

As the drive wheel 100 rotates further in the second direction 48 about the input rotational axis 16, the engagement between the pin 106 and the slot 110 causes the driven wheel 102 to rotate further about the output rotational axis 22. When the driven wheel 102 and the latch 20 have rotated approximately 90° about the output rotational axis 22, the pin 106 disengages from the slot 110. This is illustrated in FIG. 7c. FIG. 7d shows that further rotation of drive wheel 100 in the first direction 48 about the input rotational axis 16 does not cause rotation of the driven wheel 102. In the state of the Geneva mechanism 98 illustrated in FIG. 7d, an arced section of the blocking disc 104 of the drive wheel 100 is again received in one of the arced recesses 112 of the driven wheel 102. As a consequence, the driven wheel 102 is mechanically blocked by the blocking disc 104 and the driven wheel 102 cannot rotate. Thereby, the latch 20 cannot be manipulated to open.

Figure 8:
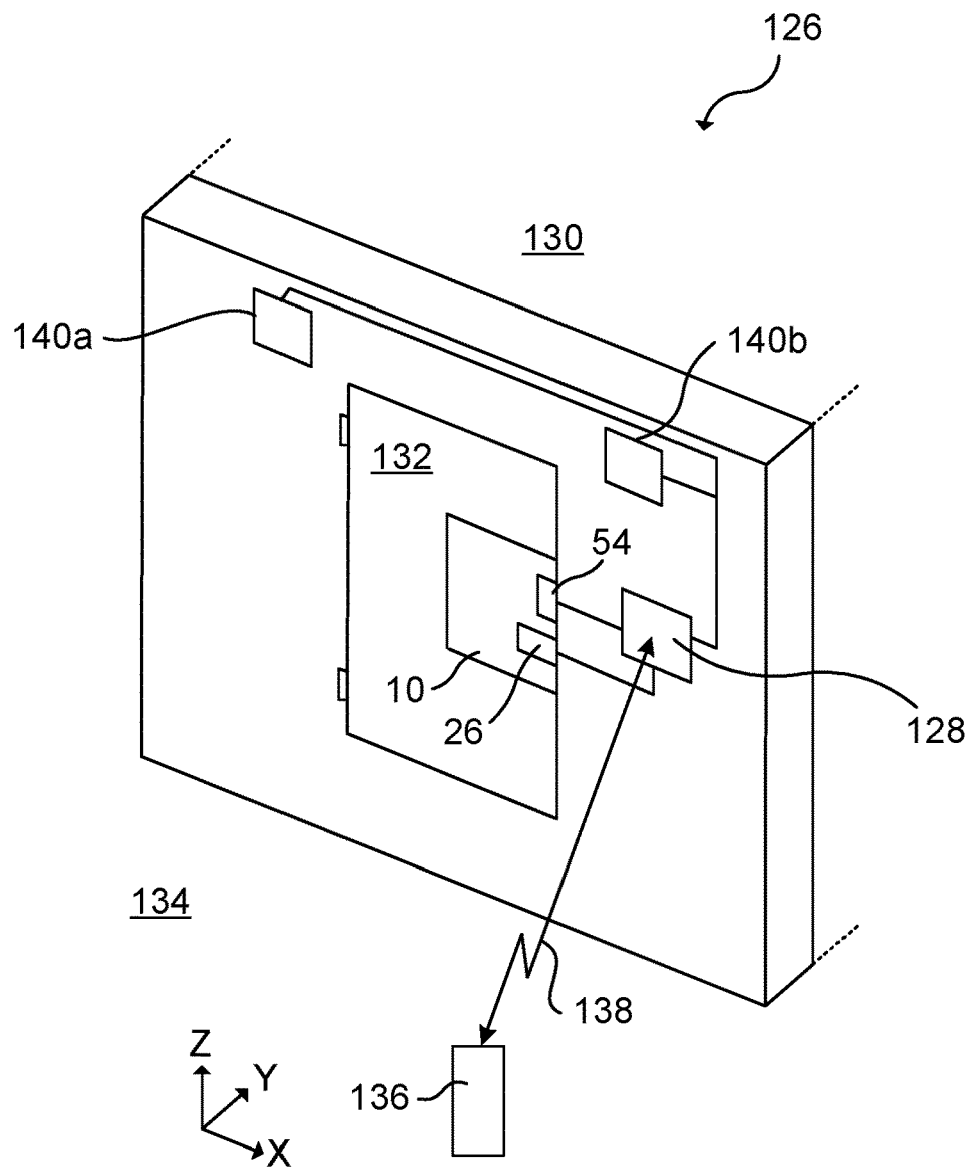
FIG. 8: schematically represents an environment in which embodiments presented herein can be applied.

FIG. 8 schematically represents an environment in which embodiments presented herein can be applied. More specifically, FIG. 8 shows an electronic locking system 126 comprising a lock device 10 according to the present disclosure and an electronic access control device 128.

Access to a physical space 130 is restricted by a movable access member 132. The movable access member 132 is positioned between the restricted physical space 130 and an accessible physical space 134. Note that the accessible physical space 134 can be a restricted physical space in itself, but in relation to the access member 132, the accessible physical space 134 is accessible. The movable access member 132 can be a door, gate, hatch, cabinet door, mailbox door, drawer, window, etc.

The access control device 128 can be powered by the energy harvesting arrangement 26 of the lock device 10. The electronic access control device 128 is connected to the transfer device 54, which is controllable by the access control device 128 to be set in the locking state or in the unlocking state.

The access control device 128 communicates with a portable key device 136 over a wireless interface 138 using a plurality of antennas 140a-b. The portable key device 136 is any suitable device portable by a user and which can be used for authentication over the wireless interface 138. The portable key device 136 is typically carried or worn by the user and may be implemented as a mobile phone, smartphone, key fob, wearable device, smart phone case, RFID (Radio Frequency Identification) card, etc. In FIG. 8, two antennas 140a-b can be seen. However, only one antenna or more than two antennas may be provided in connection with the access control device 128. Using wireless communication, the authenticity and authority of the portable key device 136 can be checked in an access control procedure, e.g. using a challenge and response scheme, after which the access control device 128 grants or denies access.

When the access control procedure results in granted access, the access control device 128 sends an unlock signal to the transfer device 54, whereby the transfer device 54 is moved from the locking state to the unlocking state. In this embodiment, this can e.g. imply a signal over a wire-based communication, e.g. using a serial interface (e.g. RS485, RS232), Universal Serial Bus (USB), Ethernet, or even a simple electric connection (e.g. to the transfer device 54), or alternatively using a wireless interface.

When the transfer device 54 is in the unlocking state, the output member 18 can be rotated about the output rotational axis 22 by means of rotation of the input member 12 about the input rotational axis 16. By rotating the latch 20 connected to the output member 18 in this way, the access member 132 can be opened.

When the access control procedure results in denied access, the access control device 128 does not send an unlock signal to the transfer device 54. In this way, access to a restricted physical space 130 can be controlled by the access control device 128.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. A lock device for an electronic locking system, the lock device comprising:
   an input member arranged to rotate about an input rotational axis;
   an output member arranged to rotate about an output rotational axis;
   an energy harvesting arrangement configured to generate electric energy from rotation of the input member in a first direction about the input rotational axis; and
   a selective transfer device movable between a locking state, in which the output member cannot be rotated about the output rotational axis by means of rotation of the input member about the input rotational axis, and an unlocking state, in which the output member can be rotated about the output rotational axis by means of rotation of the input member in the first direction about the input rotational axis;
   wherein the transfer device is powered by the energy harvesting arrangement; and
   wherein the energy harvesting arrangement comprises:
     an electric generator;
     a drive member displaceable, by rotation of the input member, from a starting position to a releasing position, the drive member arranged to drive the electric generator by at least displacement of the drive member from the starting position to the releasing position;
     an elastic element arranged to store mechanical energy from the displacement of the drive member from the starting position to the releasing position; and
     a release mechanism arranged to release mechanical energy stored in the elastic element to a returning displacement of the drive member when the drive member reaches the releasing position.

2. The lock device according to claim 1, wherein the input member comprises an engaging structure; wherein the output member comprises an engageable structure arranged to be engaged by the engaging structure; wherein the transfer device is constituted by a blocking device movable between a blocking state, in which the blocking device blocks the output member from rotating about the output rotational axis, and an unblocking state, in which the output member is allowed to rotate about the output rotational axis; and wherein the engaging structure is rotatable about the input rotational axis through an angular clearance prior to engaging the engageable structure.

3. The lock device according to claim 2, wherein the angular clearance is between 45° to 135°, about the input rotational axis.

4. The lock device according to claim 1, wherein the transfer device is constituted by a coupling device movable between a decoupling state, in which the input member is decoupled from the output member, and a coupling state, in which the input member is coupled to the output member.

5. The lock device according to claim 1, wherein the transfer device is constituted by a blocking and coupling device, the blocking and coupling device comprising:
a blocking part movable between a blocking state, in which the blocking part blocks the output member from rotating about the output rotational axis, and an unblocking state, in which the output member is allowed to rotate about the output rotational axis; and
a coupling part movable between a decoupling state, in which the input member is decoupled from the output member, and a coupling state, in which the input member is coupled to the output member;
wherein the coupling part is arranged to be moved between the decoupling state and the coupling state in common with a movement of the blocking part between the blocking state and the unblocking state.

6. The lock device according to claim 1, further comprising a Geneva mechanism having a rotatable drive wheel and a rotatable driven wheel, wherein the drive wheel is rotatable by rotation of the input member about the first rotational axis when the transfer device adopts the unlocking state, wherein the drive wheel cannot be rotated by rotation of the input member about the first rotational axis when the transfer device adopts the locking state, and wherein the output member is constituted by the driven wheel.

7. The lock device according to claim 6, further comprising a differential gear, the differential gear comprising:
a rotatable differential input, connected to, coupled to, integrally formed with, or constituted by the input member;
a rotatable differential output, connected to, coupled to, integrally formed with, or constituted by the drive wheel; and
a rotatable ring gear;
wherein the differential gear is configured to transmit a rotation of the differential input to a rotation of the differential output when the ring gear is blocked and to not transmit a rotation of the differential input to a rotation of the differential output when the ring gear is unblocked; and
wherein the transfer device is constituted by a blocking device movable between a blocking state, in which the blocking device blocks the ring gear, and an unblocking state, in which the blocking device unblocks the ring gear.

8. The lock device according to claim 1, further comprising a handle connected to, or integrally formed with, the input member.

9. The lock device according to claim 1, further comprising a latch connected to, or integrally formed with, the output member.

10. The lock device according to claim 1, wherein the drive member is displaceable by means of a rotation about the input rotational axis and wherein an angular distance about the input rotational axis between the starting position and the releasing position is less than 90°.

11. An electronic locking system comprising a lock device according to claim 1 and an electronic access control device powerable by the energy harvesting arrangement.

12. A method for operating a lock device of an electronic locking system, the method comprising:
manually rotating an input member a first angular distance in a first direction about an input rotational axis while harvesting energy from the rotation by an energy harvesting arrangement;
moving a selective transfer device from a locking state, in which an output member cannot be rotated about an output rotational axis by means of rotation of the input member about the input rotational axis, to an unlocking state, in which the output member can be rotated about the output rotational axis by means of rotation of the input member about the input rotational axis, with energy from the energy harvesting arrangement; and
rotating the output member about the output rotational axis by manually rotating the input member a second angular distance, beyond the first angular distance, in the first direction about the input rotational axis;
wherein the energy harvesting arrangement comprises:
an electric generator;
a drive member displaceable, by rotation of the input member, from a starting position to a releasing position, the drive member arranged to drive the electric generator by at least displacement of the drive member from the starting position to the releasing position;
an elastic element arranged to store mechanical energy from the displacement of the drive member from the starting position to the releasing position; and
a release mechanism arranged to release mechanical energy stored in the elastic element to a returning displacement of the drive member when the drive member reaches the releasing position.

13. The method according to claim 12, wherein:
rotating the input member the first angular distance comprises rotating an engaging structure of the input member through an angular clearance relative to an engageable structure of the output member; and
moving the selective transfer device comprises moving the selective transfer device constituted by a blocking device from a blocking position, in which the blocking device blocks the output member from rotating about the output rotational axis, to an unblocking position, in which the output member is allowed to rotate about the output rotational axis.

14. The method according to claim 12, wherein moving the selective transfer device comprises moving the selective transfer device constituted by a coupling device from a decoupling position, in which the input member is decoupled from the output member, to a coupling position, in which the input member is coupled to the output member.

* * * * *